United States Patent
Sanghavi et al.

(10) Patent No.: US 9,578,173 B2
(45) Date of Patent: Feb. 21, 2017

(54) VIRTUAL ASSISTANT AIDED COMMUNICATION WITH 3$^{rd}$ PARTY SERVICE IN A COMMUNICATION SESSION

(71) Applicant: Apple Inc., Cupertino, CA (US)

(72) Inventors: Mehul K. Sanghavi, Sunnyvale, CA (US); Jeffrey P. Schwerdtfeger, Santa Cruz, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/732,625

(22) Filed: Jun. 5, 2015

(65) Prior Publication Data

US 2016/0360039 A1    Dec. 8, 2016

(51) Int. Cl.
*H04M 3/00* (2006.01)
*H04M 5/00* (2006.01)
(Continued)

(52) U.S. Cl.
CPC .......... *H04M 3/5183* (2013.01); *H04L 51/046* (2013.01); *H04L 51/18* (2013.01);
(Continued)

(58) Field of Classification Search
CPC ........ G10L 15/00; G06Q 10/06; H04M 3/323; H04M 3/36; H04M 3/4217; H04M 3/4285; H04M 3/42195; H04M 3/493; H04M 3/4931; H04M 3/4933; H04M 3/4935; H04M 3/4936; H04M 3/4938; H04M 3/42221; H04M 3/51; H04M 3/5166; H04M 3/5175; H04M 3/5183; H04M 3/5191; H04M 3/523; H04M 3/5231; H04M 3/5232; H04M 3/5233; H04M 3/5235; H04M 3/5237; H04M 3/5238; H04M 2203/2011; H04M 2203/2061; H04M 2242/00; H04M 2242/08; H04M 2242/12
(Continued)

(56) References Cited

U.S. PATENT DOCUMENTS 6,466,654 B1 *  10/2002  Cooper ................... G10L 15/26
                                                              379/88.01
9,325,842 B1 *   4/2016  Siddiqi ............... H04M 3/4931
(Continued)

*Primary Examiner* — Khai N Nguyen
(74) *Attorney, Agent, or Firm* — Blank Rome LLP

(57) ABSTRACT

Disclosed are systems, methods, and non-transitory computer-readable storage media for utilizing a virtual assistant to assist a user with a communication session between the user and a third party service. A user can use a communication application to enter a message directed to the virtual assistant and request assistance to communicate with a 3$^{rd}$ party service. In response, the virtual assistant can access a set of communication instructions associated with the 3$^{rd}$ party service. The set of communication instructions can include a set of commands for communicating with the 3$^{rd}$ party service, services provided by the 3$^{rd}$ party service and data needed by the 3$^{rd}$ party service to facilitate communication. The virtual assistant can use the communication instructions to gather data needed by the 3$^{rd}$ party service, communicate with the 3$^{rd}$ party service and present the user with data received from the 3$^{rd}$ party service.

21 Claims, 24 Drawing Sheets

(51) Int. Cl.
  *H04M 3/51* (2006.01)
  *H04L 12/58* (2006.01)
  *H04M 1/725* (2006.01)
  *H04L 29/06* (2006.01)
(52) U.S. Cl.
  CPC .... *H04L 65/1069* (2013.01); *H04M 1/72552* (2013.01); *H04M 2203/256* (2013.01)
(58) Field of Classification Search
  USPC .......... 379/210.01, 265.01, 265.02, 265.03,379/265.04, 265.05, 265.06, 265.07, 265.08,379/265.09, 265.1, 265.11, 265.12, 265.13,379/265.14, 266.01, 266.02, 266.03, 266.04,379/266.05, 266.06, 266.07, 266.08, 266.09,379/266.1
  See application file for complete search history.

(56) References Cited

U.S. PATENT DOCUMENTS

| | | |
|---|---|---|
| 2009/0018834 A1 | 1/2009 | Cooper et al. |
| 2011/0047246 A1 | 2/2011 | Frissora et al. |
| 2013/0238729 A1 | 9/2013 | Holzman et al. |
| 2013/0262168 A1* | 10/2013 | Makanawala ........... H04L 51/32 705/7.14 |
| 2014/0074589 A1 | 3/2014 | Nielsen et al. |
| 2014/0310365 A1* | 10/2014 | Sample ................... H04L 51/16 709/206 |
| 2015/0088998 A1* | 3/2015 | Isensee .................. H04L 51/02 709/206 |
| 2015/0121216 A1* | 4/2015 | Brown ................... G06N 3/006 715/707 |
| 2015/0178785 A1 | 6/2015 | Salonen |
| 2016/0099892 A1* | 4/2016 | Palakovich ............. H04L 51/04 709/206 |

* cited by examiner

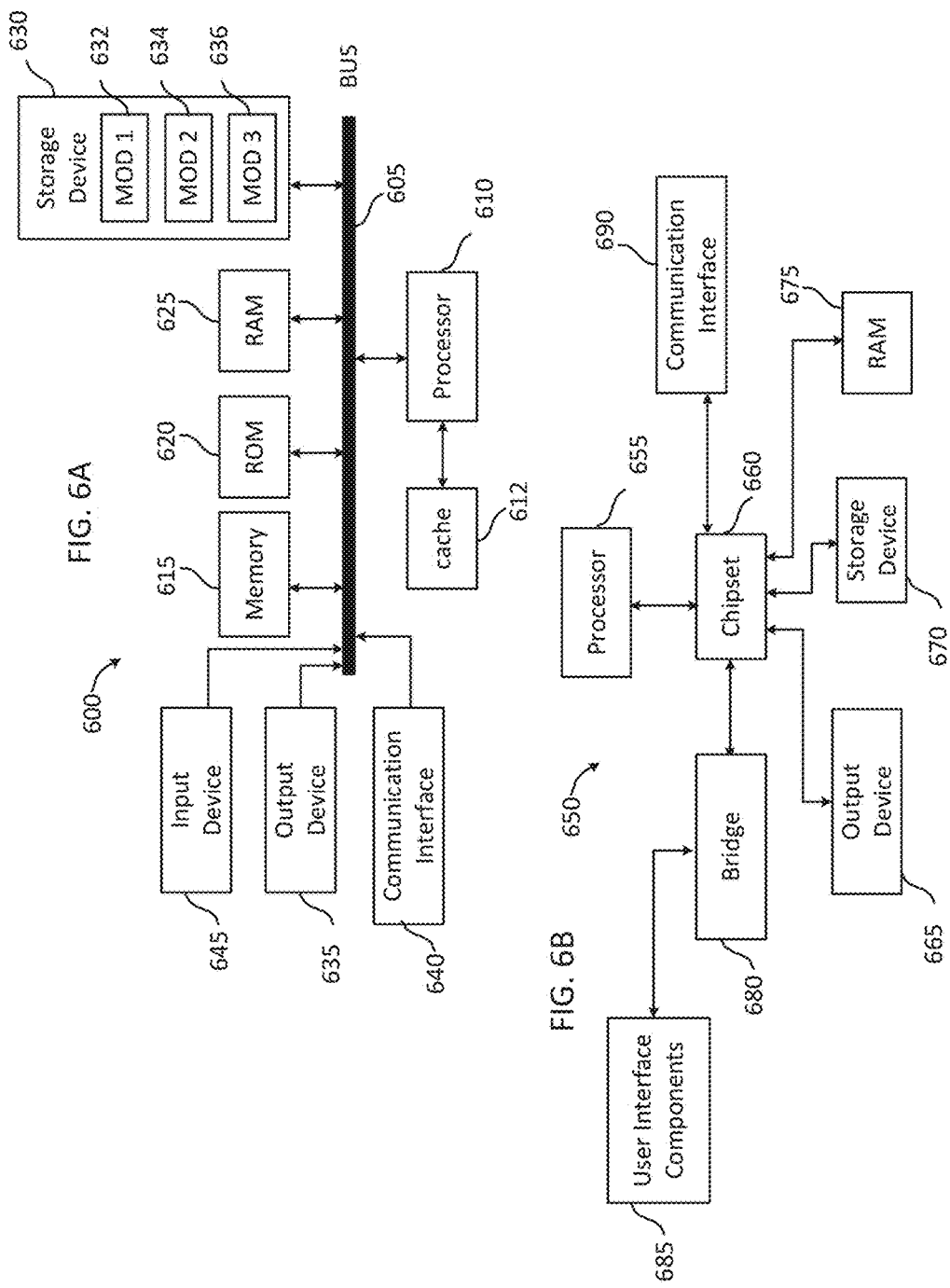

VIRTUAL ASSISTANT AIDED COMMUNICATION WITH 3$^{rd}$ PARTY SERVICE IN A COMMUNICATION SESSION

TECHNICAL FIELD

The present technology pertains to communication sessions between a user and a third party service, and more specifically pertains to utilizing a virtual assistant to assist the user with a communication session between the user and the third party service.

BACKGROUND

Current computing devices can include functionality that enables users to communicate with each other by transmitting and receiving messages. For example, many computing devices include text and/or instant messaging functionality that enable users of the computing devices to transmit text, images, sounds, etc., to the client devices of one or more other users. Users can use this functionality to have conversations, make plans and/or perform any other number of tasks.

In addition to communicating with friends, family, etc., users can also utilize communication sessions to communicate with 3$^{rd}$ party services, such as airlines, banks, customer service departments, etc. For example, some 3$^{rd}$ party services provide users with an application and/or website that includes functionality to communicate with a representative of the 3rp party service. While this allows users to communicate with a representative, it also requires the user to access the 3$^{rd}$ part website and/or download the 3$^{rd}$ party service's application. Further, many 3$^{rd}$ party services require a user to navigate a series of selections and/or provide a set of information prior to connecting the user to a representative. Accordingly, improvements are needed.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, and non-transitory computer-readable storage media for utilizing a virtual assistant to assist a user with a communication session between the user and a third party service. A communication session can be a conversation between one or more participants using a communication application such as a text and/or instant messaging application. For example, a communication application can be an application such as iMessage® available by Apple Inc., of Cupertino, Calif.

A virtual assistant can be an application, module, software, etc., capable of analyzing messages included in the communication session to identify tasks and provide assistance with completing the identified tasks. For example, a virtual assistant can be an application such as Siri® available by Apple Inc., of Cupertino, Calif., that uses semantic analysis to analyze text, recognize terms and interpret the intended meaning.

A task can be any type of action that a virtual assistant can provide assistance with. For example, a task can include facilitating communication between the user and a 3$^{rd}$ party service, performing specified actions with the 3$^{rd}$ party service, gathering and providing information to the 3$^{rd}$ party service, receiving information from the 3$^{rd}$ party service, etc. A 3$^{rd}$ party service can be any type of service, business, etc. For example, a 3$^{rd}$ party service can be an airline, bank, insurance company, store, etc.

In some embodiments, a user can communicate with the virtual assistant as part of the communication session. For example, a user can use the communication application to enter a message directed to the virtual assistant. The virtual assistant can analyze the entered message and determine that the message was directed to the virtual assistant and, in response, assist the user. For example, the virtual assistant can identify a task from the message and assist the user with completing the task.

In some embodiments, the virtual assistant can assist the user to communicate with a 3$^{rd}$ party service. For example, a user can use the communication application to enter a message directed to the virtual assistant that requests that the virtual assistant connect the user with a 3$^{rd}$ party service. In response, the virtual assistant can access a set of communication instructions associated with the 3$^{rd}$ party service. The set of communication instructions can include a set of commands for communicating with the 3$^{rd}$ party service, services provided by the 3$^{rd}$ party service as well as data needed by the 3$^{rd}$ party service to facilitate communication with the 3$^{rd}$ party service. The virtual assistant can use the communication instructions to gather data needed by the 3$^{rd}$ party service, communicate with the 3$^{rd}$ party service and present the user with data received from the 3$^{rd}$ party service.

Communication with the 3$^{rd}$ party service can be presented to the user as part of the communication session. For example, the virtual assistant can present messages prompting the user to provide data and make selections, as well as present the user with any data received from the 3$^{rd}$ party service. Further, the virtual assistant can connect the user to a representative of the 3$^{rd}$ party service as part of the communication session. The user can then user the communication session to communicate with the representative.

BRIEF DESCRIPTION OF THE DRAWINGS

The above-recited and other advantages and features of the disclosure will become apparent by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIGS. 6A and 6B illustrate exemplary possible system embodiments.

DESCRIPTION

Figure 1:
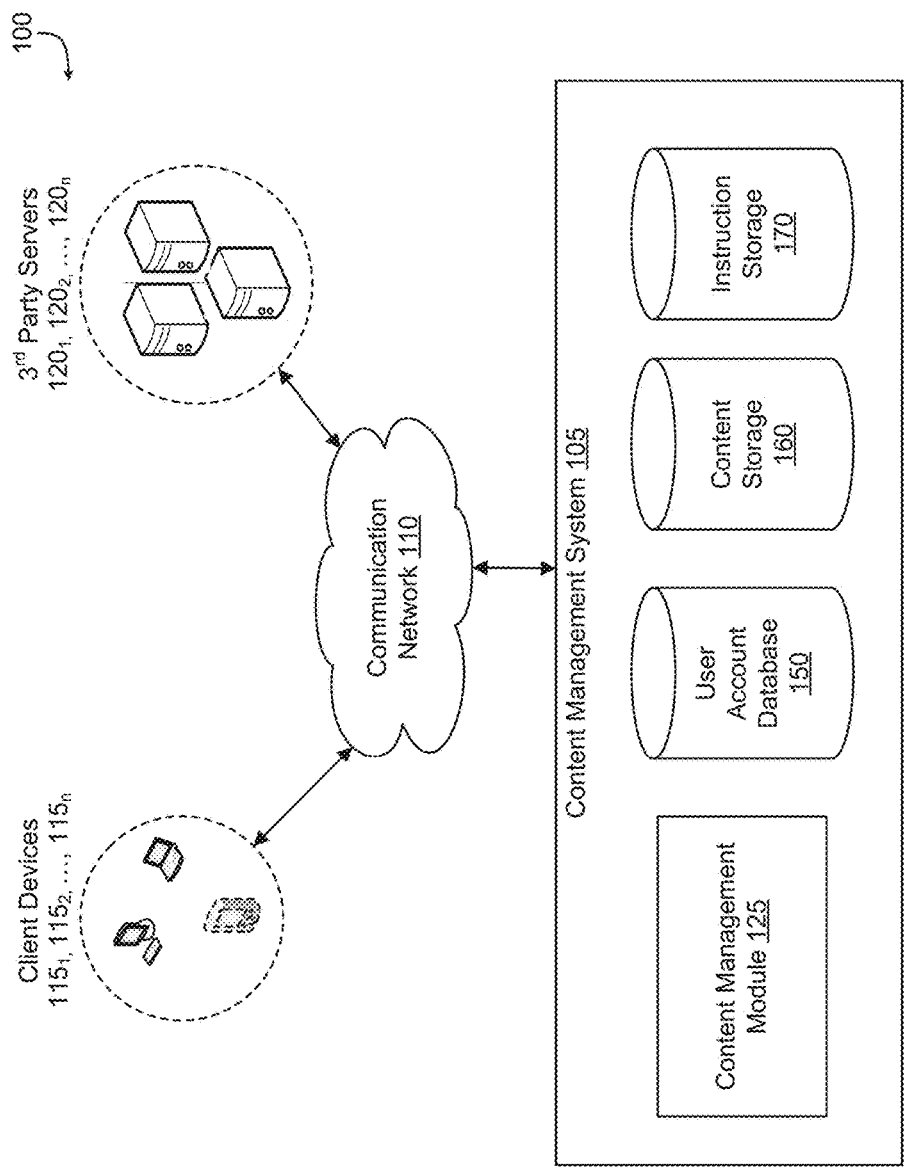
FIG. 1 shows an exemplary configuration of devices and a network in accordance with the invention.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The disclosed technology addresses the need in the art for utilizing a virtual assistant to assist a user with a communication session between the user and a third party service. A communication session can be a conversation between one or more participants using a communication application such as a text and/or instant messaging application. For example, a communication application can be an application such as iMessage® available by Apple Inc., of Cupertino, Calif.

A virtual assistant can be an application, module, software, etc., capable of analyzing messages included in the communication session to identify tasks and provide assistance with completing the identified tasks. For example, a virtual assistant can be an application such as Siri® available by Apple Inc., of Cupertino, Calif., that uses semantic analysis to analyze text, recognize terms and interpret the intended meaning.

A task can be any type of action that a virtual assistant can provide assistance with. For example, a task can include facilitating communication between the user and a $3^{rd}$ party service, performing specified actions with the $3^{rd}$ party service, gathering and providing information to the $3^{rd}$ party service, receiving information from the $3^{rd}$ party service, etc. A $3^{rd}$ party service can be any type of service, business, etc. For example, a $3^{rd}$ party service can be an airline, bank, insurance company, store, etc.

In some embodiments, a user can communicate with the virtual assistant as part of the communication session. For example, a user can use the communication application to enter a message directed to the virtual assistant. The virtual assistant can analyze the entered message and determine that the message was directed to the virtual assistant and, in response, assist the user. For example, the virtual assistant can identify a task from the message and assist the user with completing the task.

In some embodiments, the virtual assistant can assist the user to communicate with a $3^{rd}$ party service. For example, a user can use the communication application to enter a message directed to the virtual assistant that requests that the virtual assistant connect the user with a $3^{rd}$ party service. In response, the virtual assistant can access a set of communication instructions associated with the $3^{rd}$ party service. The set of communication instructions can include a set of commands for communicating with the $3^{rd}$ party service, services provided by the $3^{rd}$ party service as well as data needed by the $3^{rd}$ party service to facilitate communication with the $3^{rd}$ party service. The virtual assistant can use the communication instructions to gather data needed by the $3^{rd}$ party service, communicate with the $3^{rd}$ party service and present the user with data received from the $3^{rd}$ party service.

Communication with the $3^{rd}$ party service can be presented to the user as part of the communication session. For example, the virtual assistant can present messages prompting the user to provide data and make selections, as well as present the user with any data received from the $3^{rd}$ party service. Further, the virtual assistant can connect the user to a representative of the $3^{rd}$ party service as part of the communication session. The user can then user the communication session to communicate with the representative.

FIG. 1 illustrates an exemplary system configuration 100, wherein electronic devices communicate via a network for purposes of exchanging content and other data. As illustrated, multiple computing devices can be connected to communication network 110 and be configured to communicate with each other through use of communication network 110. Communication network 110 can be any type of network, including a local area network ("LAN"), such as an intranet, a wide area network ("WAN"), such as the internet, or any combination thereof. Further, communication network 110 can be a public network, a private network, or a combination thereof. Communication network 110 can also be implemented using any number of communication links associated with one or more service providers, including one or more wired communication links, one or more wireless communication links, or any combination thereof. Additionally, communication network 110 can be configured to support the transmission of data formatted using any number of protocols.

Multiple computing devices can be connected to communication network 110. A computing device can be any type of general computing device capable of network communication with other computing devices. For example, a computing device can be a personal computing device such as a desktop or workstation, a business server, or a portable computing device, such as a laptop, smart phone, or a tablet PC. A computing device can include some or all of the features, components, and peripherals of computing device 500 of FIGS. 5A and 5B.

To facilitate communication with other computing devices, a computing device can also include a communication interface configured to receive a communication, such as a request, data, etc., from another computing device in network communication with the computing device and pass the communication along to an appropriate module running on the computing device. The communication interface can also be configured to send a communication to another computing device in network communication with the computing device.

In system 100, a user can communication with other users through use of client devices $115_1$, $115_2$, . . . , $115_n$ (collectively "115") connected to communication network 110. Client devices 115 can be any type of computing device, such as a smart phone, tablet, personal computer, etc. Client devices 115 can include a communication application that enables a user of a client device $115_i$, to transmit and receive messages to and from other client devices 115. For example, a communication application can be a text and/or instant messaging application such as iMessage® available by Apple Inc., of Cupertino, Calif.

A user can also use client devices 115 to interact with $3^{rd}$ party servers $120_k$, $120_2$, . . . , $120_n$ (collectively "120") connected to communication network 110. $3^{rd}$ party servers 120 can be one or more of any type of computing devices and be configured to maintain and provide data to requesting client devices 115. For example, a $3^{rd}$ party server $120_i$ can be affiliated with and managed by a $3^{rd}$ party service to store and provide data for the 3rd party service. For example, a $3^{rd}$ party server 120$_i$, can store and provide web data that can be rendered by client devices 115 to present a webpage, website, etc., to a requesting user.

3$^{rd}$ party servers 120 can also provide one or more services that can be accessed by client devices 115 using specified commands, such as commands defined by an application program interface (API). A service can be any type of action or transaction, such as providing specified data, performing a financial transaction, completing a purchase, etc.

3$^{rd}$ party servers 120 can support connections from a variety of different types of client devices 115, such as desktop computers; mobile computers; mobile communications devices (e.g. mobile phones, smart phones, tablets, etc.); smart televisions; set-top boxes; and/or any other network enabled computing devices.

System 100 can also include content management system 105. Content management system 105 can include one or more computing devices configured to manage content items for multiple user accounts. A content item can include any type of digital asset such as an application, audio file, text file, video file, etc.

Content management system 105 can support connections from a variety of different types of client devices 115, such as desktop computers; mobile computers; mobile communications devices (e.g. mobile phones, smart phones, tablets, etc.); smart televisions; set-top boxes; and/or any other network enabled computing devices. Client devices 115 can be of varying type, capabilities, operating systems, etc. Furthermore, content management system 105 can concurrently accept connections from and interact with multiple client devices 115.

A user can interact with content management system 105 via a client-side application installed on client device 115$_i$. In some embodiments, the client-side application can include a content management system specific component. For example, the component can be a stand-alone application, one or more application plug-ins, and/or a browser extension. However, the user can also interact with content management system 105 via a third-party application, such as a web browser, that resides on client device 115$_i$ and is configured to communicate with content management system 105. In either case, the client-side application can present a user interface (UI) for the user to interact with content management system 105. For example, the user can interact with content management system 105 via a client-side application integrated with the file system or via a webpage displayed using a web browser application.

Content management system 105 can be configured to manage content items and data for multiple user accounts. For example, content management system 105 can allow users to purchase, store and access content items, calendar data, contact data, etc. Furthermore, content management system 105 can make it possible for a user to access the stored data, such as content items, calendar data, contact data, etc., from multiple client devices 115. Accessing a content item can include receiving metadata describing the content item, streaming the content item from content management system 105 and/or downloading the content item to one of client devices 115.

To facilitate the various content management services, a user can create a user account with content management system 105. The account information for each created user account can be maintained in user account database 150. User account database 150 can store profile information for each user account, including a unique account identifier identifying the user account, personal information, user-name, password, email address, home address, credit card information, banking information, calendar data, contact data, etc. User account database 150 can also include account management information, such as content storage locations, security settings, personal configuration settings, client devices authorized to access the user account, etc.

A user account can be used to purchase, manage and store content items, such as digital data, documents, text files, audio files, video files, etc. For example, content management system 105 can provide an online content retailer where users can purchase a variety of content items. Further, in some embodiments, a user can upload content items from one of client devices 115 to content management system 105. The purchased and uploaded content items can be assigned to the user's account and then accessed by the user from any of client devices 115. For example, a content item identifier identifying each content item assigned to a user account can be stored in user account database 150 and associated with the corresponding user account. The content item identifier can be used to identify the content item as well as the location of the content item.

The content items can be stored in content storage 160. Content storage 160 can be a storage device, multiple storage devices, or a server. Alternatively, content storage 160 can be a cloud storage provider or network storage accessible via one or more communications networks. Content management system 105 can hide the complexity and details regarding storage of the content items from client devices 115 such that the location of the content items stored by content management system 105 is not known by client devices 115. Content management system 105 can store the content items in a network accessible storage (SAN) device, in a redundant array of inexpensive disks (RAID), etc. Content storage 160 can store content items using one or more partition types, such as FAT, FAT32, NTFS, EXT2, EXT3, EXT4, ReiserFS, BTRFS, and so forth.

Content storage 160 can also store metadata describing content items, content item types, and the relationship of content items to various user accounts. The metadata for a content item can be stored as part of the content item or can be stored separately. In one variation, each content item stored in content storage 160 can be assigned a system-wide unique identifier.

Content management system 105 can include content management module 125 configured to manage and access each user account and the content items assigned to the user accounts. For example, content management module 125 can be configured to communicate with user account database 150 and content storage 160 to adjust privileges with respect to content items and otherwise manage content items.

Upon a user logging into their user account from one of client devices 115, content management module 125 can access the account information associated with the user account to identify the content items assigned to the user account, as well as account configuration data dictating presentation of the content items. Content management module 125 can then present and/or provide the content items to the user according to the account configuration data. For example, content management module 125 can access a user account to identify the content item identifiers assigned to the user account. The content item identifier can then be used to identify and locate the content items assigned to the user account, which can be presented according to the account configuration data.

Presenting the content items can include transmitting metadata describing the content items to client device 115$_i$ that was used to access the user account. Client device $115_i$ can then use the received metadata to present the content items that the user account can access. For example, client device $115_i$ can present information identifying the content items available to the user account in a content item library. This can include presenting the title of the content items, images such as an album or book cover, description of the content item, etc.

Content management system 105 can also maintain a set of communication instructions for one or more $3^{rd}$ party services. For example, content management system 105 can include instruction storage 170 that is configured to maintain multiple sets of communication instructions.

A set of communication instructions can include data that can be used to communicate with a $3^{rd}$ party service. For example, a set of communication instructions for a $3^{rd}$ party service can include a listing of services provided by the $3^{rd}$ party service. As an example, services provided by a $3^{rd}$ party service such as a bank can include providing an account balance, transferring money amongst accounts, depositing a check, speaking to a representative, etc. As another example, services provided by a $3^{rd}$ party service such as an airline can include purchasing an airline ticket, checking a flight arrival time, changing a schedule flight, canceling a flight, speaking to a representative, etc.

A set of communication instruction can also include a listing of data needed by the $3^{rd}$ party service to facilitate communication. For example, a $3^{rd}$ party service may require a user name, account number, etc. The listing of data can also include data needed by the $3^{rd}$ party based on service provided by the $3^{rd}$ party service. For example, to provide a service such as changing a flight, a $3^{rd}$ party service such as an airline may require an existing flight number, customer name, etc. As another example, to provide a service such as booking a flight, the airline may require data such as a departing city, destination city, desired departure and return date, etc.

A set of communication instructions can also include one or more commands for communicating with the $3^{rd}$ party service. The commands can be defined by an application program interface (API) and be used to perform the various services provided by the $3^{rd}$ party service. The commands can be labeled or identified based on the corresponding service.

Each set of communication instructions stored in instruction storage 170 can be tagged, labeled and/or otherwise identified based on the $3^{rd}$ party service associated with the set of communication instructions. For example, a set of communications instructions can be tagged with a unique $3^{rd}$ party identifier for the corresponding $3^{rd}$ party service.

Content management system 105 can provide one or more sets of communication instructions to any requesting client device 115. For example, content management system 105 can receive an instruction request from a client device $115_i$ and, in response, provide the client device $115_i$ with the set of communication instructions. An instruction request can include an identifier identifying a $3^{rd}$ party service. Content management system 105 can use the received identifier to identify the corresponding set of communication instructions from instruction storage 170.

Figure 2:
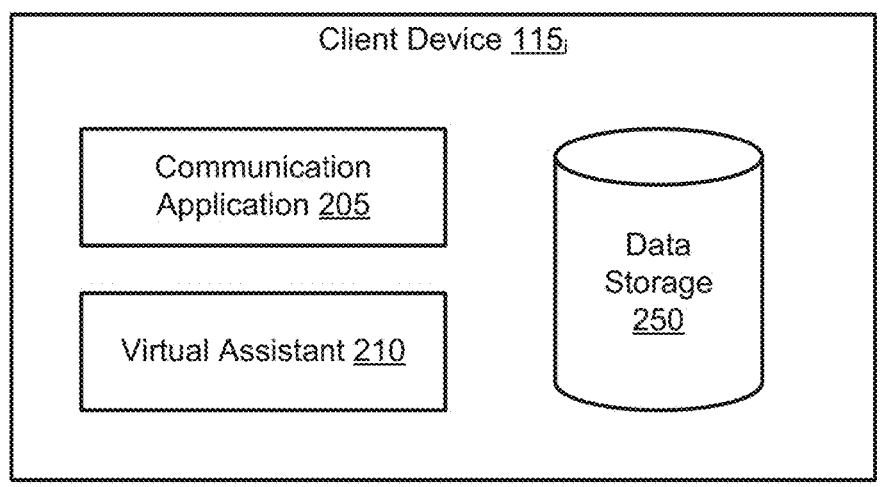
FIG. 2 shows an embodiment of a client device configured to enable a user to utilize a virtual assistant to perform tasks during a communication session.

FIG. 2 shows an embodiment of a client device $115_i$, configured to enable a user to utilize a virtual assistant to communicate with a $3^{rd}$ party service during a communication session. FIG. 2 is described in view of the system shown in FIG. 1. As shown, client device $105_i$ includes communication application 205. Communication application 205 can be any type of application configured to enable a user to send and receive data messages with one or more other client devices 115. A data message can be any type of data that can be transmitted from one computing device to another, such as text data, image data, sound data, etc. In some embodiments, communication application 205 can be a text and/or instant messaging application such as iMessage® available by Apple Inc., of Cupertino, Calif.

A user of client device $115_i$ can use communication application 205 to conduct communication sessions with one or more groups of users and/or entities. A communication session can be a group of messages transmitted between a group of users and/or entities. For example, a communication session can be an instant messaging conversation between a group of two or more users. Alternatively, a communication session can be an instant messaging conversation between one or more users and a third party service, such as with a representative of the $3^{rd}$ party service and/or an automated computer system maintained by the $3^{rd}$ party service. As another example, a communication session can be an instant messaging conversation between one or more users and a virtual assistant.

Communication application 205 can provide a user with a messaging interface that enables the user to conduct a communication session. For example, the messaging interface can enable a user to create a new communication session by selecting one or more participant users and entering a message to be transmitted to the participant users. Further, the messaging interface can enable a user to view existing communication session and enter and transmit new messages as part of the existing communication sessions.

Client device $115_i$ can also include virtual assistant 210 configured to assist the user with tasks during a communication session. Virtual assistant 210 can be an application, module, software, etc., capable of analyzing messages included in a communication session to identify tasks and provide the user with assistance completing the identified tasks. For example, virtual assistant 210 can be an application such as Siri® available by Apple Inc., of Cupertino, Calif., that uses semantic analysis to analyze text, recognize terms and interpret the intended meaning.

A task can be any type of function, actions, etc., with which virtual assistant 210 can assist a user. For example, a task can be retrieving information, such as retrieving the current time, retrieving directions to a specified destination, retrieving sports scores, retrieving weather information, retrieving movie times, etc. Further a task can be coordinating and executing a transaction and/or communication with a $3^{rd}$ party service, such as scheduling a meeting, performing a financial transaction, purchasing tickets, initiating communication with a representative, etc.

Client device $105_i$ can enable a user to select to utilize virtual assistant 210 in relation to one or more communication sessions. In some embodiments, communication application 205 can be configured to enable a user to select to utilize virtual assistant 210 by adding virtual assistant 210 as a participant of the communication session. For example, the user can add a nickname associated with virtual assistant 210 as a participant to a communication session. In response, communication application 205 can communicate with virtual assistant 210 to utilize virtual assistant 210 to assist with the communication session.

Further, in some embodiments, communication application 205 can transmit a notification message to the other participants of the communication session indicating that the user of client device $115_i$ has selected to utilize virtual assistant 205. For example, communication application 205 can transmit a message as part of the communication session indicating that the user of client device $115_i$ is utilizing virtual assistant 205. As another example, the nickname associated with virtual assistant 210 can be presented as a member of the communication session, thereby indicating that at least one participant of the communication session is utilizing the virtual assistant. In some embodiments, the other participants can be prompted regarding whether they would like to utilize the virtual assistant in regards to the communication session.

To assist a user with a communication session, virtual assistant 210 can analyze messages included in the communication session to identify tasks. For example, virtual assistant 210 can use semantic analysis to recognize terms, sets of terms, etc., and interpret the intended meaning of the terms to identify one or more tasks that the user may need assistance with.

Virtual assistant 210 can use any type or techniques of semantic analysis known in the art to identify tasks with which virtual assistant 210 can assist the user. For example, in some embodiments, the semantic analysis can include the use of natural language processing (e.g., speech tagging, noun-phrase chunking, dependency and constituent parsing, etc.) to translate text into parsed text. Virtual assistant 210 can then analyze the parsed text to identify tasks. For example, virtual assistant 210 can use question and intent analysis, to detect user commands and/or actions from the text (e.g., schedule a meeting, set my alarm, purchase tickets, connect me with a representative, etc.). Virtual assistant 210 can then analyze the resulting commands and/or actions to determine whether they are commands and/or actions with which virtual assistant can assist the user. For example, virtual assistant 210 can compare the tasks and/or actions to a list of known commands and/or actions with which virtual assistant 210 can assist the user. Any commands and/or actions identified by virtual assistant as being a command and/or action with which virtual assistant 210 can assist the user can be identified as a task by virtual assistant 210.

Further, virtual assistant 210 can identify a $3^{rd}$ party service with which the user would like to communicate and/or perform a task. For example, a message may identify a specific $3^{rd}$ party service, such as a specified airline, bank, etc., and virtual assistant 210 can identify the $3^{rd}$ party service from the message. Alternatively, a message may identify a type of service and virtual assistant can determine the appropriate $3^{rd}$ party service. For example, messages such as "book a flight," "check my account balance" and "make a reservation" can infer a type of service such as airline, bank and restaurant respectively.

Virtual assistant 210 can select a $3^{rd}$ party service based on the type of service determined from the message. For example, virtual assistant 210 can select a $3^{rd}$ party service of the specified type based on user history and/or user preferences. Alternatively, virtual assistant 210 can query the user regarding which $3^{rd}$ party service the user would like to use. For example, virtual assistant 210 can identify candidate $3^{rd}$ party services and prompt the user as part of the communication to select from one of the candidate $3^{rd}$ party services.

Virtual assistant 210 can analyze messages transmitted amongst the participant users of the communication session to identify tasks. This can include messages entered by a user of client device $115_i$, to be transmitted to the other participants as part of the communication session, as well as messages received from other users as part of the communication session.

Further, virtual assistant 210 can determine whether a message provided by the user of client device $115_i$ was intended for the other participants of the communication session or intended for the virtual assistant. A user can use communication application 205 to enter a message intended for virtual assistant 210, such as a request or command that the virtual assistant assist the user with a specified task. For example, a user can enter requests such as "help us schedule a meeting," "help me book a flight" "connect me to a representative," etc., and virtual assistant can determine that the message was intended for virtual assistant 210. In some embodiments, a user can address messages intended for the virtual assistant by using a nickname for the personal assistant. For example, the user can enter a messages such as "Assistant, connect me to a representative." Virtual assistant 210 can determine that the message was intended for the virtual assistant based on the use of the nickname addressing the virtual assistant 210.

In some embodiments, messages determined by virtual assistant 210 to be intended for virtual assistant 210 will not be transmitted to the other participant users of the communication session. Likewise, responses provided by virtual assistant 210 can be presented as part of the communication session on client device $115_i$, while not being presented to the other participant users of the communication session. In this way, a user of client device $115_i$ can have a separate conversation with virtual assistant 210 to perform a specified task.

To assist a user with a task, virtual assistant 210 can communicate with one or more computing devices to gather data and perform requested operations. For example, virtual assistant 210 can gather data maintained by client device $115_i$ in memory and/or from other applications on client device $115_i$, such as calendar data, contact data, financial information, flight information, bank account numbers, etc. Further, virtual assistant 210 can gather data from one or more components of client device $115_i$, such as geographic coordinate data from Global positioning system (GPS) component, temperature data, sound data, etc. Virtual assistant 210 can further edit, modify or delete data, such as creating new calendar entries, modifying contact information, etc.

Virtual assistant 210 can also gather data from one or more computing devices in network communication with client device $115_i$. For example, virtual assistant 210 can communicate with one or more of $3^{rd}$ party servers 120 to request and receive data. For example, virtual assistant 210 can communicate with $3^{rd}$ party servers 120 to gather sports scores, movie show times, driving directions, etc. Further, virtual assistant 210 can perform requested operations, such as purchase movie tickets, login to a user account, provide payment information, etc.

Further, virtual assistant 210 can also gather data from client devices 115. For example, to assist a user in determining the estimated time of arrival of a participant of the communication session, virtual assistant 210 can communicate with a client device $115_j$ of the participant user to gather geographic location data of the user, which can then be used to calculate the estimated time of arrival. In some embodiments, virtual assistant 210 can be required to receive approval from the participant of the communication session prior to receiving data from the participants client device $115_j$. For example, virtual assistant 210 can transmit a message as part of the communication session to the client device $115_j$ requesting the specified data and the receiving participant can select to either approve or deny the request.

In some embodiments, virtual assistant 210 can gather data from content management system 105. For example, virtual assistant 210 can gather data from user accounts maintained by content managements system 210. This can include demographic data for one or more participants of the communication session, contact information, content items assigned to each user, such as applications utilized by each user, etc. In some embodiments, virtual assistant 210 can be required to receive approval from the participant of the communication session prior to being able to access data from the participant's user account. For example, virtual assistant 210 can transmit a message as part of the communication session to the client device $115_j$ requesting approval to access the participant's user account and the receiving participant can select to either approve or deny the request. As another example, virtual assistant 210 can present a user with a message as part of the communication session requesting that the user provide the user credentials associated with the user account (e.g., user name and password).

Alternatively, a participant can authorize virtual assistant 210 to access their user account by selecting to utilize the virtual assistant with respect to the communication session. Thus, virtual assistant 210 can be automatically authorized to access the user account of each participant of the communication session that has selected to utilize the virtual assistant 210. Virtual assistant 210 can transmit messages requesting approval to access the user account of any participant that has not selected to utilize the personal assistant 210.

In some embodiments, virtual assistant 210 can gather data directly from the participants of a communication session. For example, virtual assistant 210 can present a poll as part of the communication session to gather feedback from the users. This can include presenting the users with multiple options, such as potential restaurants, meeting times, available services, etc. The poll can enable each participant to enter their selection and virtual assistant 210 can select a time, restaurant, service, etc., based on the provided selections.

In some embodiments, the options presented to the users as part of a poll can be based on data gathered by virtual assistant 210 from the users. For example, to help with the task of selecting a restaurant, the virtual assistant can gather location information from each participant and select restaurants that are nearby or equidistance from the participants. The selected restaurants can then be presented to the users in a poll.

As another example, to assist users schedule a meeting, virtual assistant 210 can gather calendar information from each user to identify a set of candidate times that works best for the participants. Virtual assistant 210 can then present the candidate times to the users as part of the communication session and allow the users to provide feedback.

As another example, to assist a user to perform a financial transaction with one or more other users, virtual assistant 210 can gather data indicating payment methods available to each user and select a set of candidate payment methods that are available to each user. For example, a payment method can be an application that enables a user to transfer money from one party to another. Virtual assistant 210 can determine which payment methods are installed on each user's client device 115 and then present a set of candidate payments methods from which the user can select.

In some embodiments, virtual assistant 210 can gather communication instructions for a specified $3^{rd}$ party service and use the communication instructions to facilitate communication with the respective $3^{rd}$ party service. For example, upon determining that a user has requested that virtual assistant 210 assist the user to communicate with a $3^{rd}$ party service, virtual assistant 210 can transmit an instruction request to content management system 120 that request the set of communication instructions for the $3^{rd}$ party service. The instruction request can identify the specified $3^{rd}$ party service, for example, by including the name of the $3^{rd}$ party service, an identifier identifying the $3^{rd}$ party service, etc.

In some embodiments, client device $115_i$ can maintain the set of communication instructions locally, for example, in data storage 250. Virtual assistant 210 can gather the appropriate set of communication instruction from data storage 250.

Virtual assistant 210 can use the communication instructions to identify services that are offered by the $3^{rd}$ party service and with which virtual assistant 210 can assist the user. For example, virtual assistant 210 can present the user with a poll within a communication session that lists the services and prompts the user to select a service with which the user would like help.

Virtual assistant 210 can use the set of communication instructions to identify data required by the $3^{rd}$ party service to facilitate communication between the user and the $3^{rd}$ party service to perform a specified service. For example, a $3^{rd}$ party service may require a user's name, flight number and departure date to perform a service such as change a user's flight. As another example, a 3rp party service may require a user's account number and password to perform a service such as providing the user with an account balance. Virtual assistant 210 can gather the required data and provide it to the $3^{rd}$ party service.

Virtual assistant 210 can utilize the commands included in the set of communication instructions to communicate with a $3^{rd}$ party service $120_i$, to transmit data, receive data, present interface elements, etc. This can enable the user to communicate and interact with the $3^{rd}$ party service completely through use of communication application 205. For example, to perform a service such as booking a flight, virtual assistant 210 can enable a user to select a departure and destination city, provide dates, select flights, present flights to the user, etc.

Virtual assistant 210 can also connect a user to a representative of a $3^{rd}$ party service so that a user can communicate directly with the representative as part of the communication session. In some embodiments, virtual assistant 210 can determine an expected wait time to be connected to a representative and notify the user of the expected wait. A communication session with a representative can remain active (e.g., messages entered will be received by the other party) until terminated by either the user or the representative or, alternatively, after a specified period of time with no activity. The communication session record will remain available to the user and the user may request that virtual assistant again reconnect the user to the representative. This further allows each party to have a record of all previous communication between the parties available within the communication session.

Figure 3:
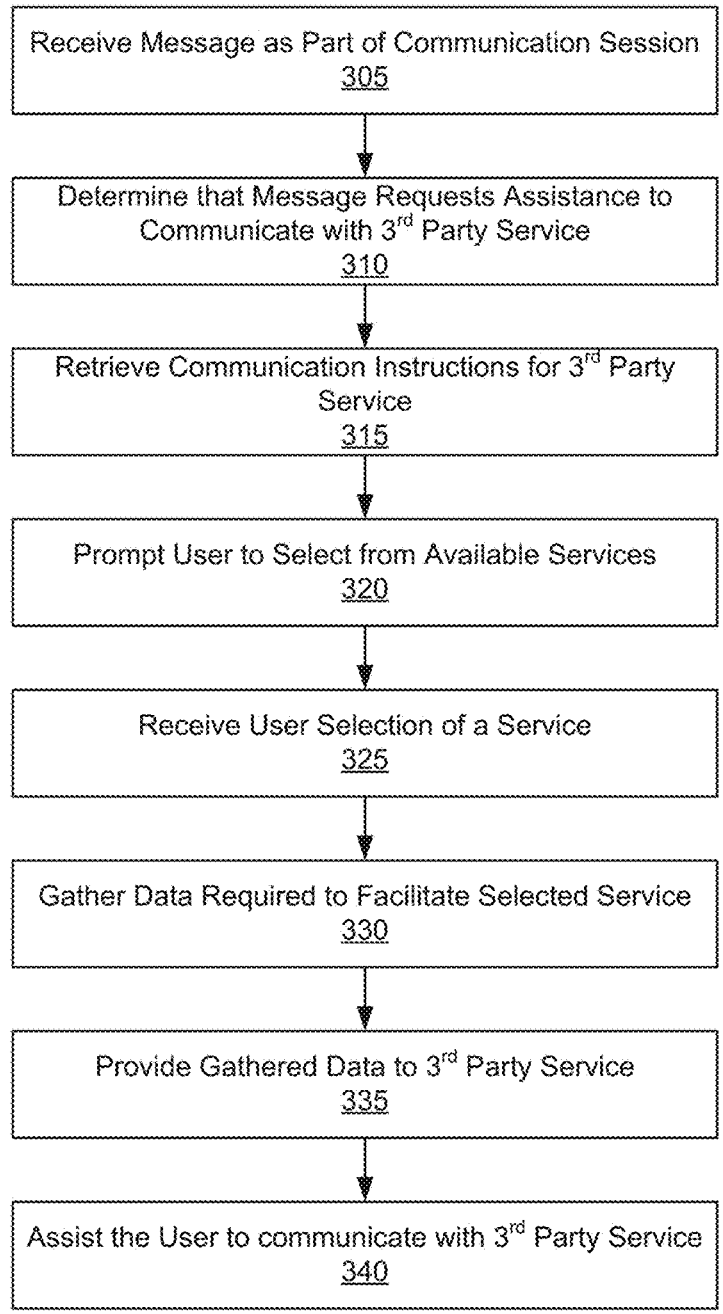
FIG. 3 shows a method of a client device utilizing a virtual assistant to assist a user communicate with a 3$^{rd}$ party service.

FIG. 3 shows a method of a client device $115_i$, utilizing a virtual assistant 120 to assist a user communicate with a $3^{rd}$ party service. The method shown in FIG. 3 is described in view of the systems shown in FIG. 1 and FIG. 2. Although specific steps are shown in FIG. 3, in other embodiments the method may have more or less steps. Further, the order in which the steps are performed is just one possible embodiment and is not meant to be limiting. The method may be performed in a variety of differing orders, including one or more steps being performed simultaneously, and/or including more or less steps than those shown in FIG. 3.

At block 305, a client device 115$_i$, can receive a message as part of a communication session. For example, a user of the client device 115$_i$, may have entered the message using communication application 205.

At block 310, the virtual assistant 210 can determine that the message requests that the virtual assistant 210 assist the user to communicate with a 3$^{rd}$ party service. For example, virtual assistant 210 can use semantic analysis to analyze the text of the message, recognize terms and interpret the intended meaning. The message may identify a specified 3$^{rd}$ party service and the virtual assistant 210 can determine that the user would like to communicate with the specified 3$^{rd}$ party service. Alternatively, the message may identify a 3$^{rd}$ party service type and the virtual assistant 210 can either select a 3$^{rd}$ party service of the specified type or query the user regarding which 3$^{rd}$ party service the user would like to communicate with.

In some embodiments, the user may use a name that is common to two or more 3$^{rd}$ party services. In this type of situation, the virtual assistant 210 can prompt the user to clarify the desired 3$^{rd}$ party service. For example, the virtual assistant can present the user with a poll including the 3$^{rd}$ party services associated with the name and ask the user to select the desired 3$^{rd}$ party service.

At block 315, the virtual assistant 210 can retrieve communication instruction for the 3$^{rd}$ party service. For example, the virtual assistant 210 can transmit an instruction request to a content management system 105 that maintains communication instructions for one or more 3$^{rd}$ party services. Alternatively, the virtual assistant 210 can retrieve the communication instructions from a data storage 250 of the client device 115$_i$.

At block 320, the virtual assistant 210 can prompt the user to select from one or more available services offered by the 3$^{rd}$ party service. For example, a 3$^{rd}$ party service such as a bank may offer multiple services such as transferring funds, retrieving an account balance, etc. As another example, a 3$^{rd}$ party service such an airline may offer services such as booking a flight, changing a flight, checking an arrival time, etc.

The virtual assistant 210 can determine the available services from the set of communication instructions for the 3$^{rd}$ party service. For example, the set of communication instructions may include a listing of services provided by the 3$^{rd}$ party service and the virtual assistant may prompt the user to select from one or more of the available services. The virtual assistant 210 can prompt the user by presenting the user with a message as part of the communication session that prompts the user to enter the service. Alternatively, the virtual assistant 210 can present the user with one or more services to choose from, for example, in the form of a poll presented in the communication session, and the user can select from one of the presented options.

In some embodiments, the message provided by the user in block 305 may identify a specified service that the user would like help with. For example, a user may enter a message such as "please help me book a flight," in which case the virtual assistant does not need to prompt the user regarding which service the user would like help with.

At block 330, the virtual assistant 210 can gather data required to facilitate the selected service. A 3$^{rd}$ party service may require specified data to provide or facilitate a selected service. For example, to provide a service such as accessing a bank account, a 3$^{rd}$ party service may require a user's account number and user account credentials. As another example, to provide a service such as booking a flight, a 3$^{rd}$ party service may require the user's name, address, desired destination and travel dates.

The virtual assistant 210 can determine the data required from the set of communication instructions for the 3$^{rd}$ party service. The set of communication instructions can identify data required by the 3$^{rd}$ party service based on a selected service and the virtual assistant 210 can identify the specified data based on the service selected by the user.

The virtual assistant 210 can automatically gather the required data. For example, the virtual assistant 210 can gather data from the user's account maintained by a content management system 105, from a data storage 250 on the client device 105$_i$, etc.

In some embodiments, the virtual assistant 210 can prompt the user to provide their user credentials prior to accessing the user's account to gather data. For example, the virtual assistant 210 can request that the user enter a user name and password, provide fingerprint verification, etc.

In some embodiments, the virtual assistant 210 can query the user for specified data. For example, the virtual assistant 210 can present the user with messages as part of the communication session that prompt the user to provide the specified data. Alternatively, the virtual assistant 210 can present the user with one or more options to select from, for example, as a poll within the communication session. The user can select from the provided options to provide the virtual assistant 210 with the specified data.

At block 335, the virtual assistant 210 can provide the gathered data to the 3$^{rd}$ party service. For example, the virtual assistant 210 can use the appropriate command from the set of communication instructions to initiate contact with a 3$^{rd}$ party server 120$_i$, associated with the 3$^{rd}$ party service and provide the gathered data to the 3$^{rd}$ party service.

At block 340, the virtual assistant 210 can assist the user communicate with the 3$^{rd}$ party service. This can include using the appropriate commands to communicate with the 3$^{rd}$ party server 120$_i$, to assist the user perform the requested service. For example, the virtual assistant 210 can transmit data to the 3$^{rd}$ party server 120$_i$, receive data from the 3$^{rd}$ party server 120$_i$, present data to the user as part of the communication session, gather data needed by the 3$^{rd}$ party service, connect the user to a representative of the 3$^{rd}$ party service, etc.

Further, in some embodiments, the virtual assistant 210 can add other users to the communication session and facilitate communication between each user and the 3$^{rd}$ party service. For example, a user may wish to change their flight to correspond to a friend flight. The virtual assistant 210 can add the friend to the communication session so that the user and the friend can both communicate with a representative and each other to schedule the appropriate flight.

Figure 4A:
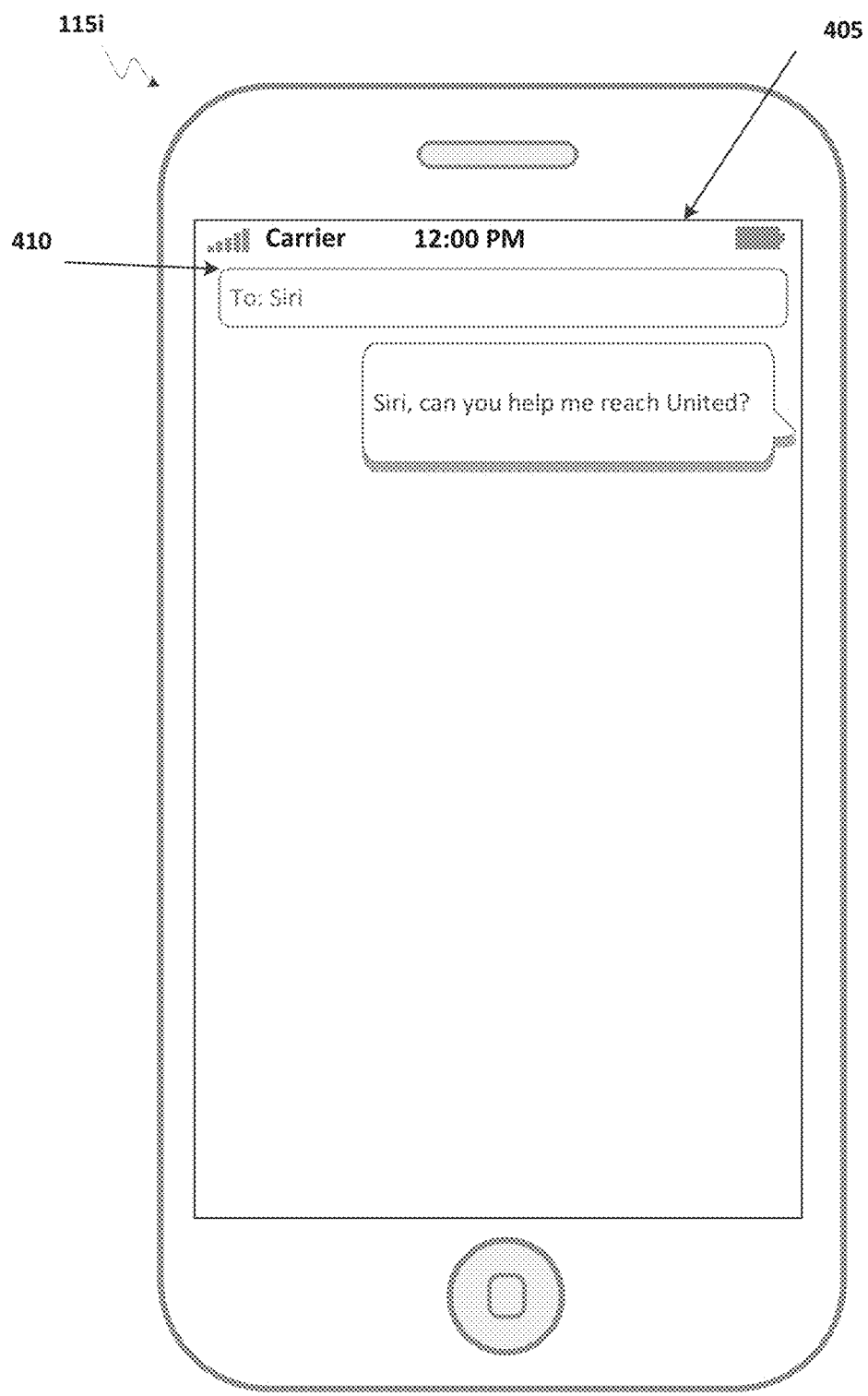
FIGS. 4A-4J show an example of a virtual assistant assisting a participant of a communication session to communicate with a 3$^{rd}$ party service.

FIGS. 4A-4J show an example of a virtual assistant assisting a participant of a communication session to communicate with a 3$^{rd}$ party service. FIGS. 4A-4J will be discussed in view of the systems shown in FIG. 1 and FIG. 2. FIG. 4A shows a client device 115$_i$ used to conduct a communication session 405. The communication session 405 can be facilitated by communication application 205.

The communication session 405 can include a recipient list 410 identifying the other participants of the communication session 405. As shown, the only other participant of the communication session 405 is virtual assistant 210. Accordingly, messages provided by the user of the client device 115$_i$ as part of the communication session 405 will only be presented on the client device 115$_i$ and will not be transmitted to another client device 115. As shown, the user has entered a message directed to the virtual assistant 210 and requesting that the virtual assistant 210 assist the user communicate with an airline.

The virtual assistant 210 can analyze the message to identify the specified $3^{rd}$ party service. Virtual assistant 210 can then communicate with the content management system 105 to transmit an instruction request for the set of communication instructions associated with the $3^{rd}$ party service. The set of communication instructions can include a listing of services provided by the $3^{rd}$ party service, listing of data needed by the $3^{rd}$ party service to facilitate communication and commands for communicating with the $3^{rd}$ party service.

Figure 4B:
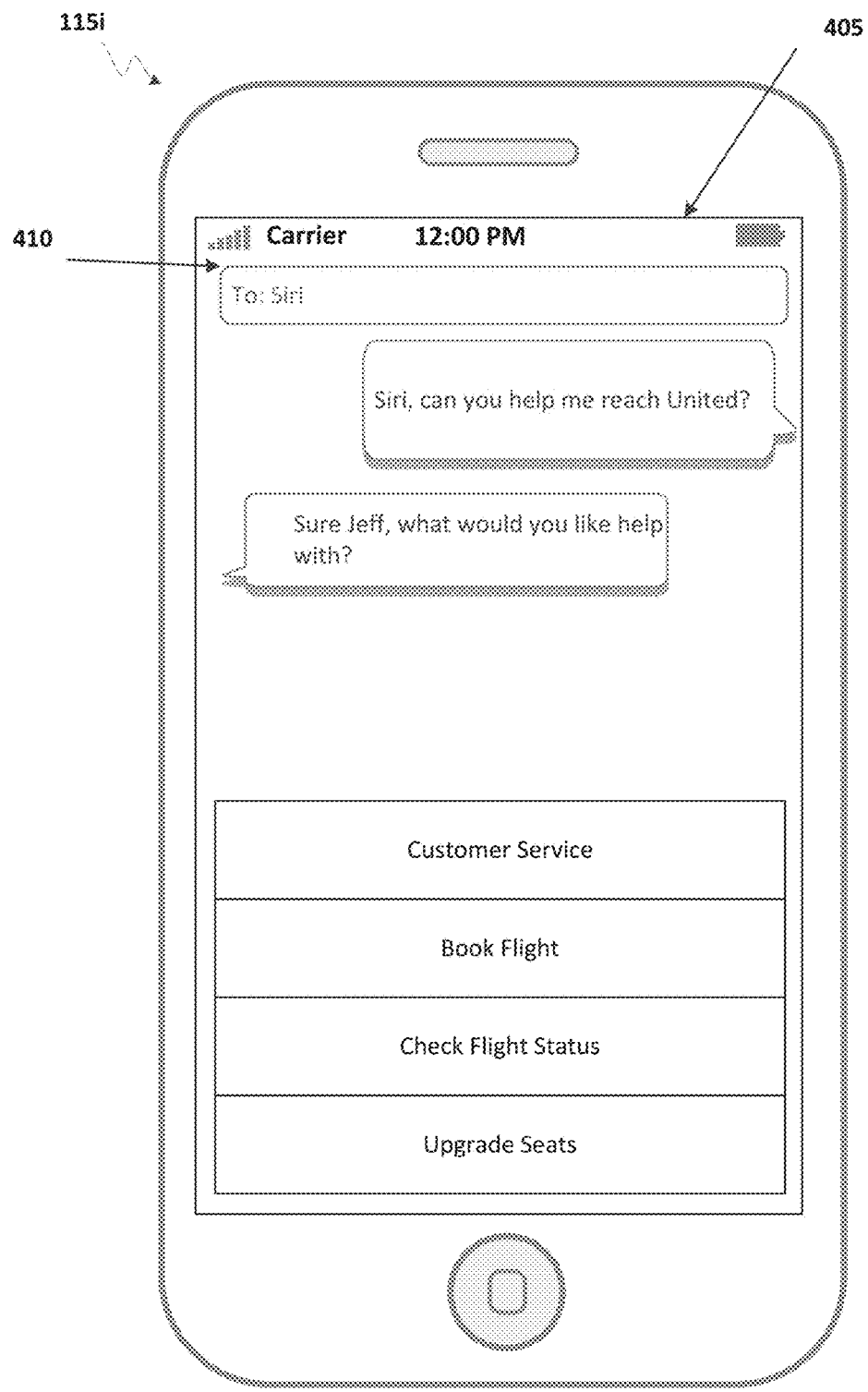

FIG. 4B shows the next step in communication session 405. As shown, virtual assistant 210 has presented the user with a reply message as part of communication session 405 and presented the user with a poll regarding what specified service the user would like help with. Virtual assistant 210 can gather the listing of for the $3^{rd}$ part service from the set of communication instructions. The user can then select the specified service with which the user would like help.

Figure 4C:
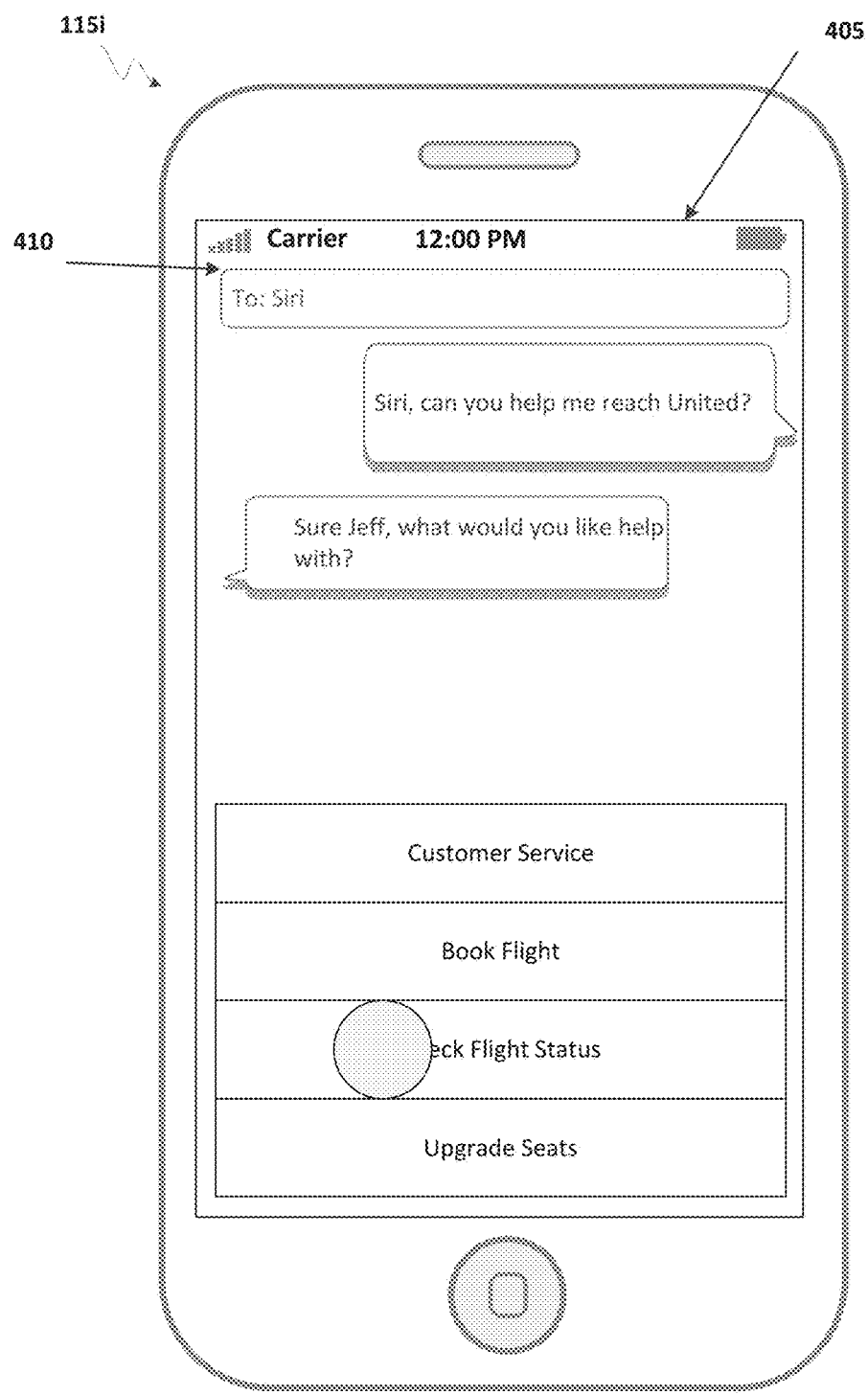

FIG. 4C shows that the user has selected to upgrade seats. Based on the user selection and the set of communication instructions, virtual assistant 210 can determine data required by the $3^{rd}$ party to perform the specified service. For example, the $3^{rd}$ party service may require the user's name, flight number, confirmation number, etc. to assist with upgrading the user's seats. Virtual assistant 210 can gather this data and provide it to the $3^{rd}$ party service. For example, virtual assistant 210 can gather data from data storage 250 and/or from the user's profile on content management system 105.

Figure 4D:
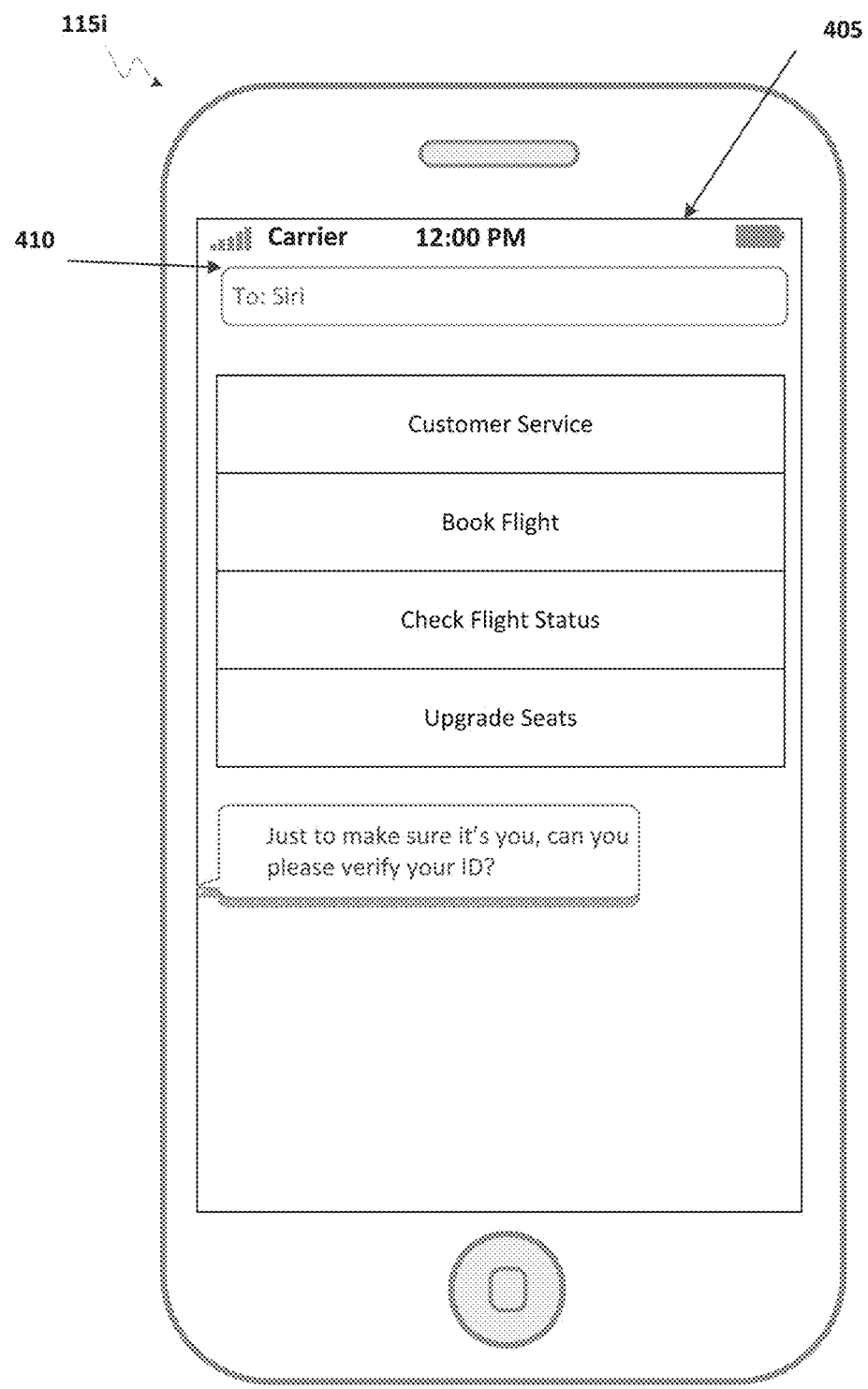

FIG. 4D shows that the virtual assistant 210 has entered a message into the communication session 405 that requests the user to provide user credentials for the user's account. This verification can be required prior to virtual assistant 210 being granted to access the user's data and provide it to a $3^{rd}$ party service.

Figure 4E:
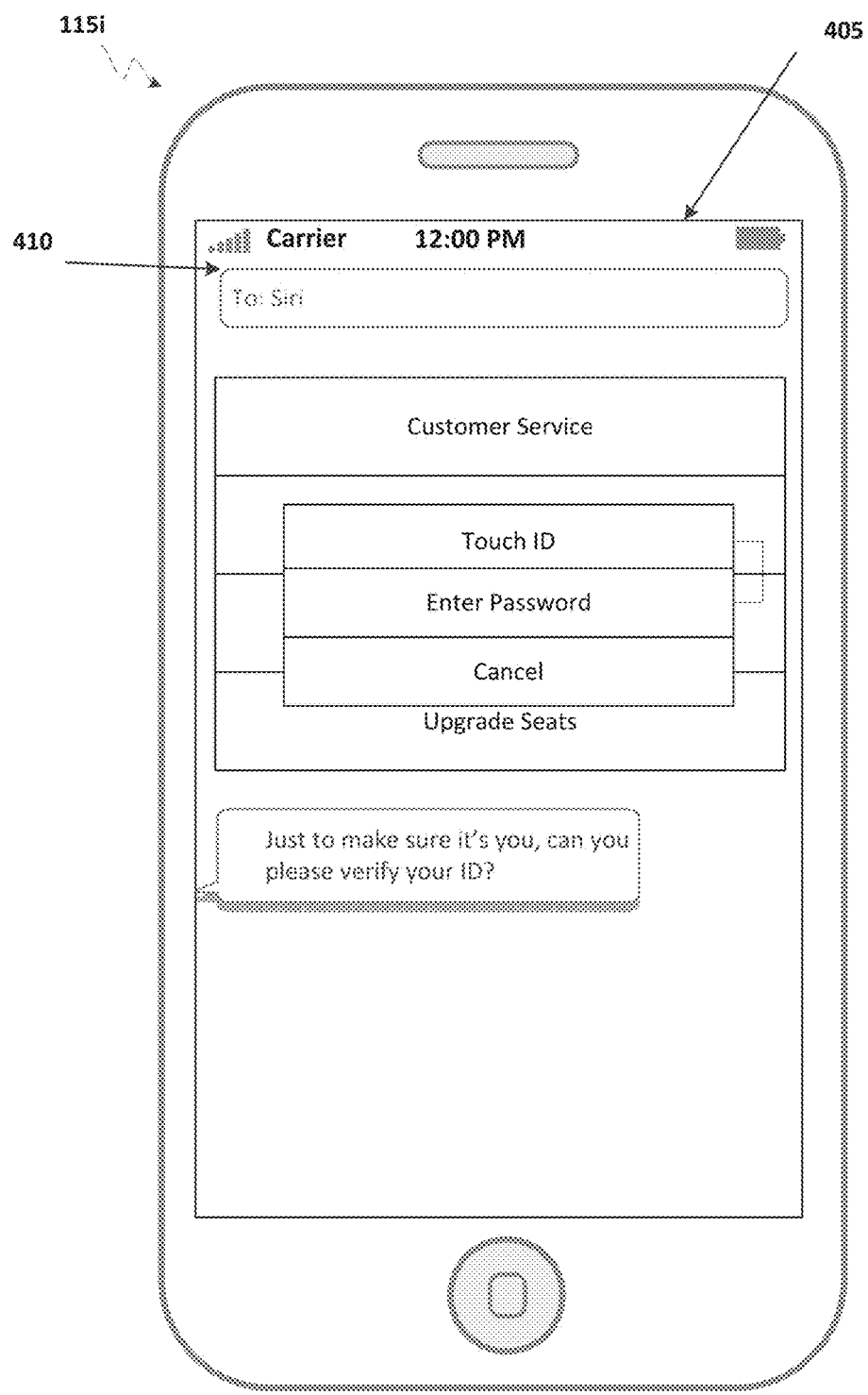

FIG. 4E shows the user being prompted to enter their user credentials. As shown, the user can select to either enter a password or provide their fingerprint.

Figure 4F:
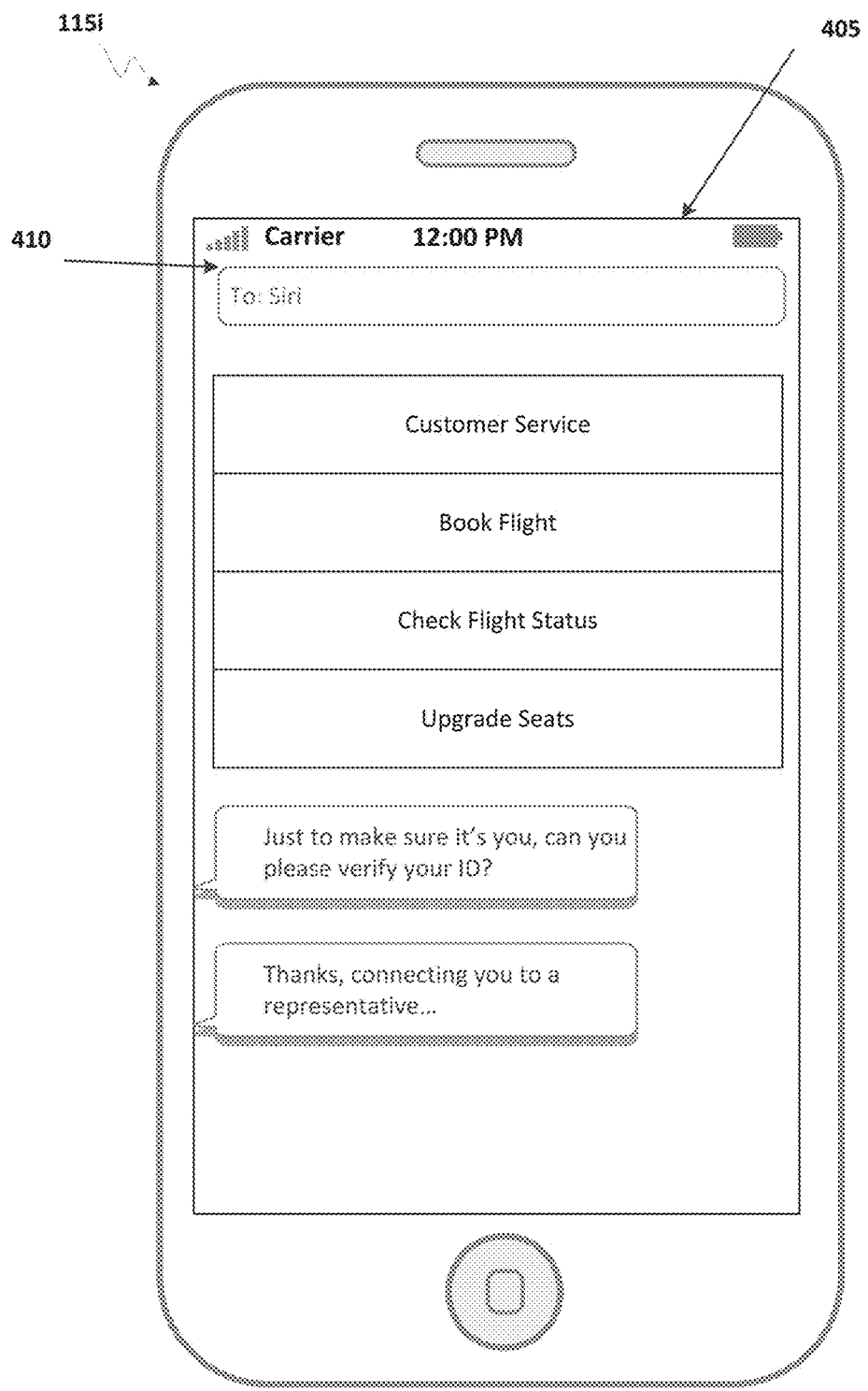

FIG. 4F shows that the virtual assistant 210 has presented the user with a message as part of the communication session 405 indicating that the virtual assistant 210 is initiating communication with the $3^{rd}$ party service. This can include the virtual assistant 210 using a command from the set of communication instructions to communicate with an appropriate $3^{rd}$ party server 120$_i$, to initiate communication for the selected service, as well as provide any necessary data to facilitate the communication.

Figure 4G:
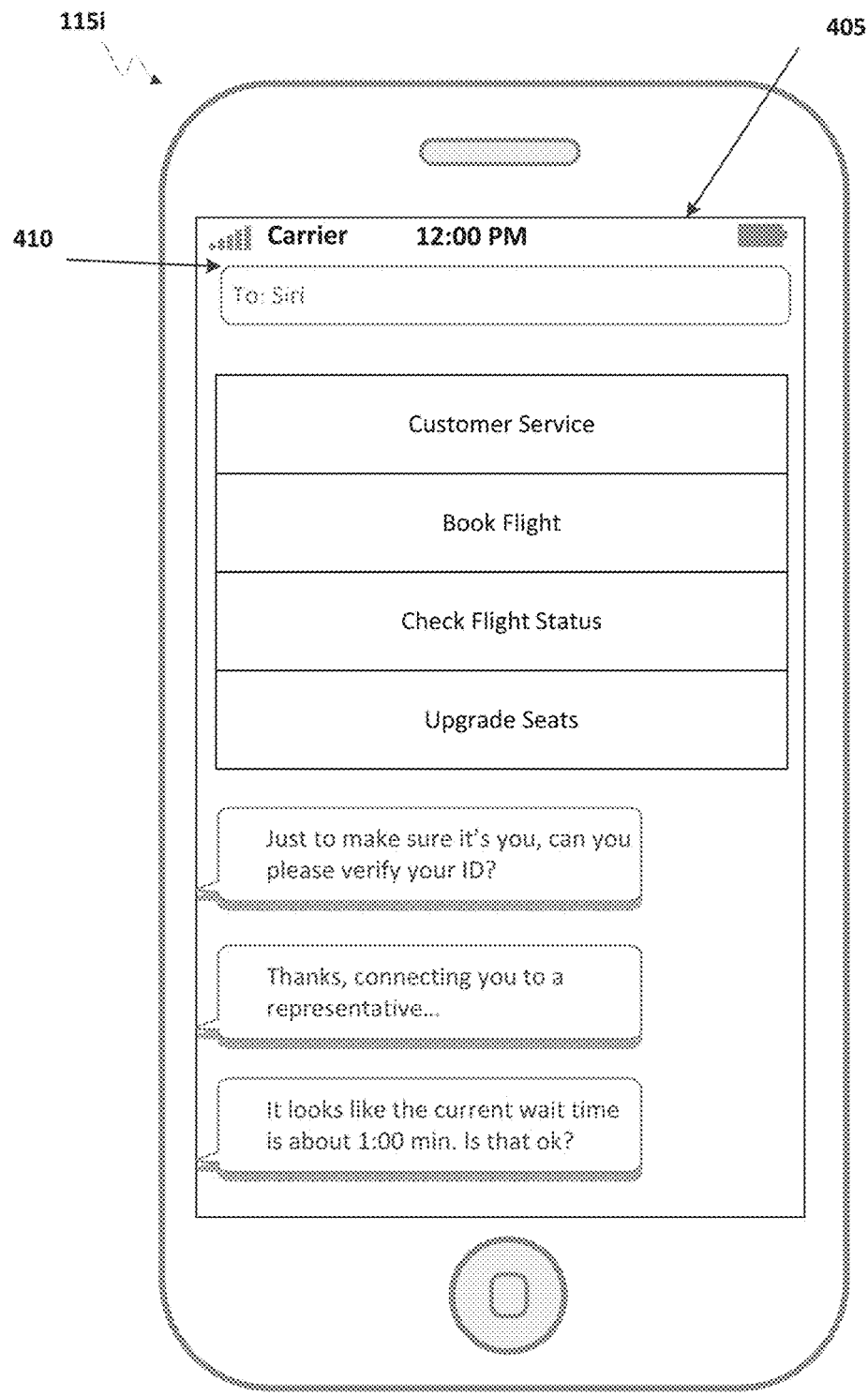

FIG. 4G shows that the virtual assistant 210 has presented the user with a message as part of the communication session 405 that notifies the user of an estimated wait time to be connected to a representative. The $3^{rd}$ party server 120$_i$, associated with the $3^{rd}$ party service can provide the virtual assistant 210 with the estimated wait time, which can then be presented to the user. Further, the virtual assistant 210 can prompt the user regarding whether the user would like to wait to speak with the representative.

In some embodiments, the virtual assistant 210 can notify a user that a representative is not currently available. For example, some $3^{rd}$ party services may only offer live representatives during specified hours. The virtual assistant 210 can notify the user that the representative is not available as well as when the user can connect to a live representative.

Figure 4H:
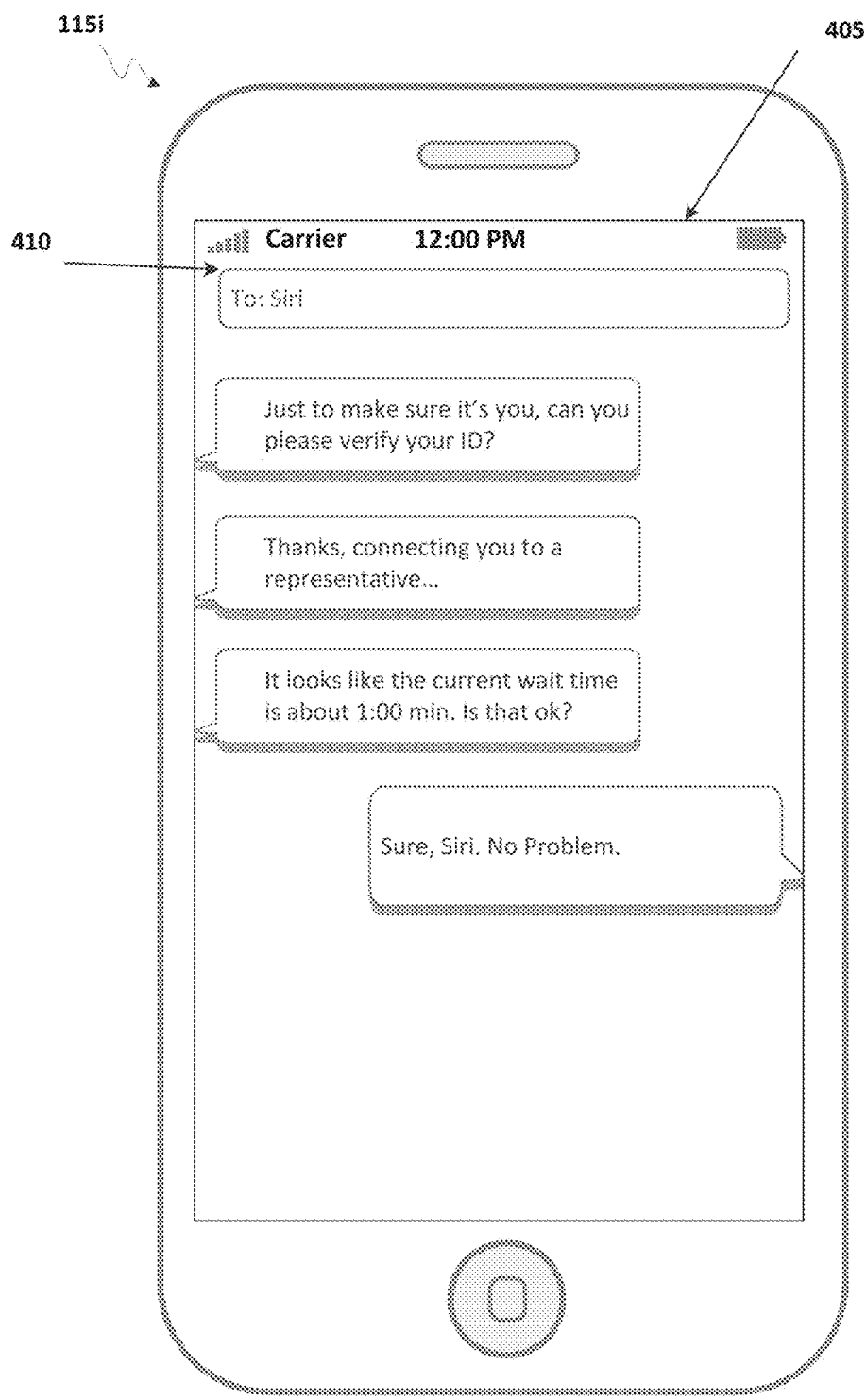

FIG. 4H shows that the user has entered a message into the communication session 405 indicating that the user is alright waiting for the estimated wait time to speak to the representative. Alternatively, if the user had indicated that the user would not like to wait, the virtual assistant 210 could terminate the attempted connection with the representative.

Figure 4I:
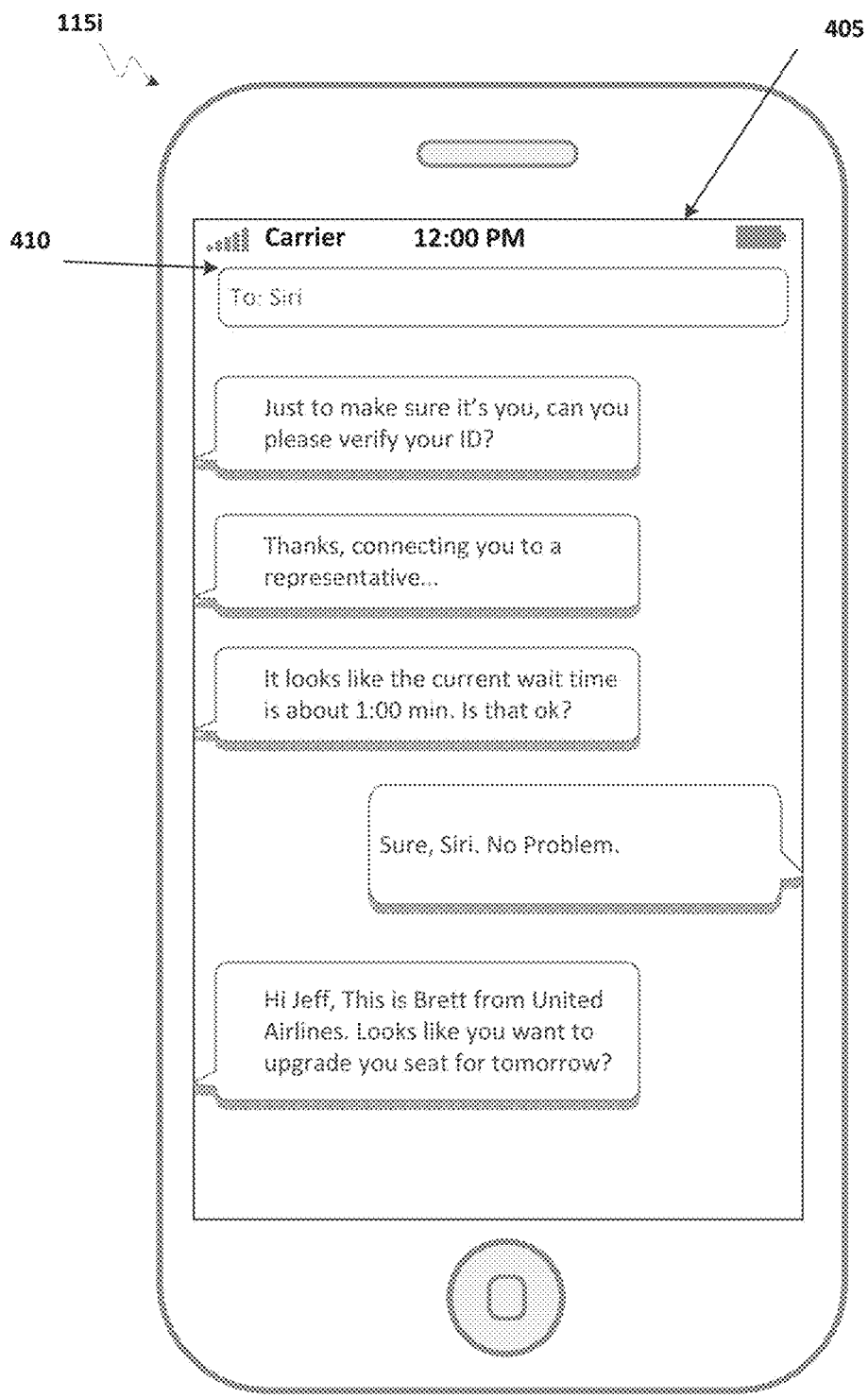

FIG. 4I shows that the user has been connected with a representative of the $3^{rd}$ party service and that the representative has presented the user with a message as part of the communication session 405 requesting specific information regarding the service specified by the user. The representative already has the users information, such as name, flight, requested service, etc., that was provided by the virtual assistant. As a result, the representative is ready to discuss the specifics of the service with the user when they are connected.

Figure 4J:
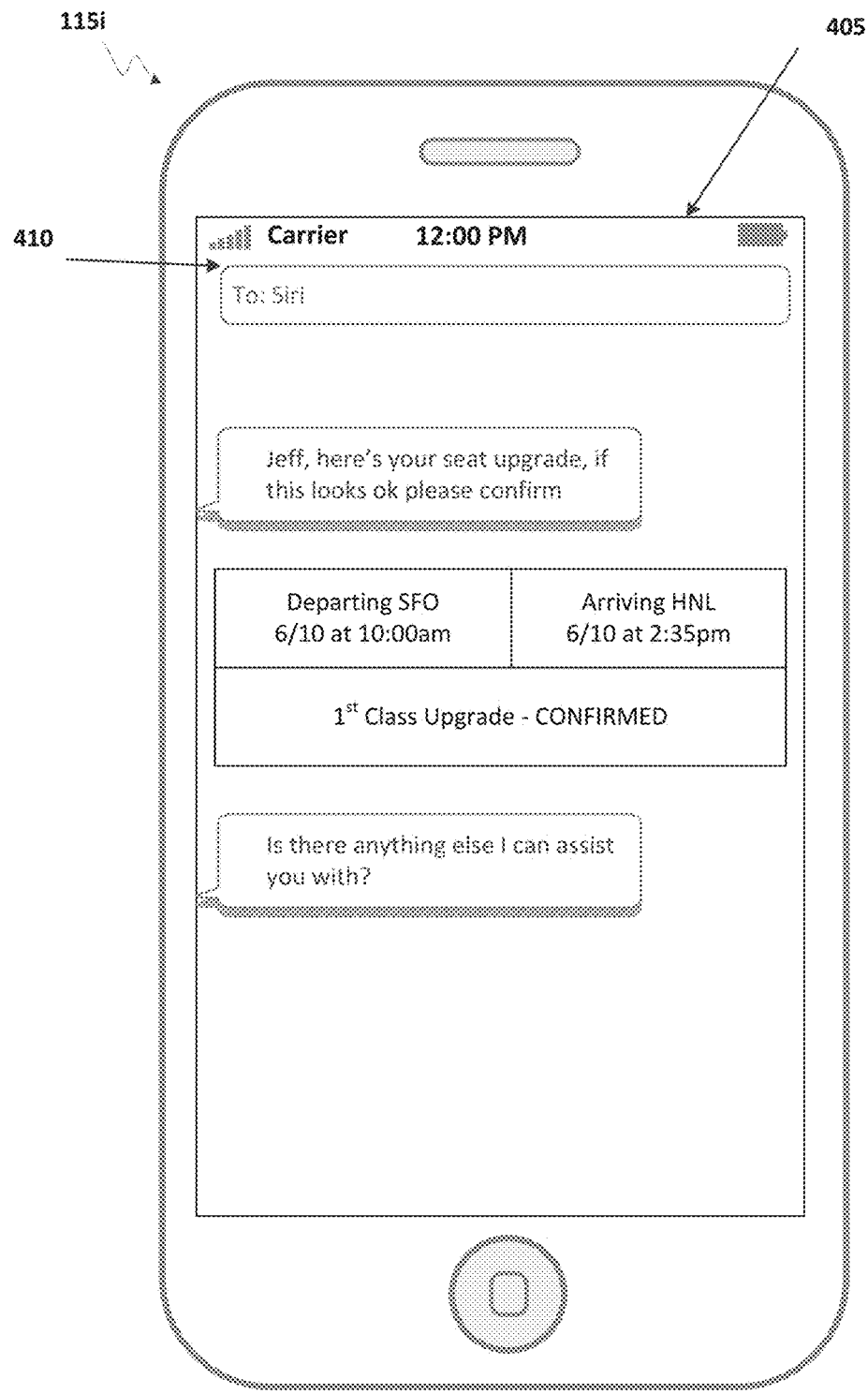

FIG. 4J shows that the representative has completed the user's request to upgrade seats. Further, the user is presented with a confirmation within the communication session 405.

Figure 5A:
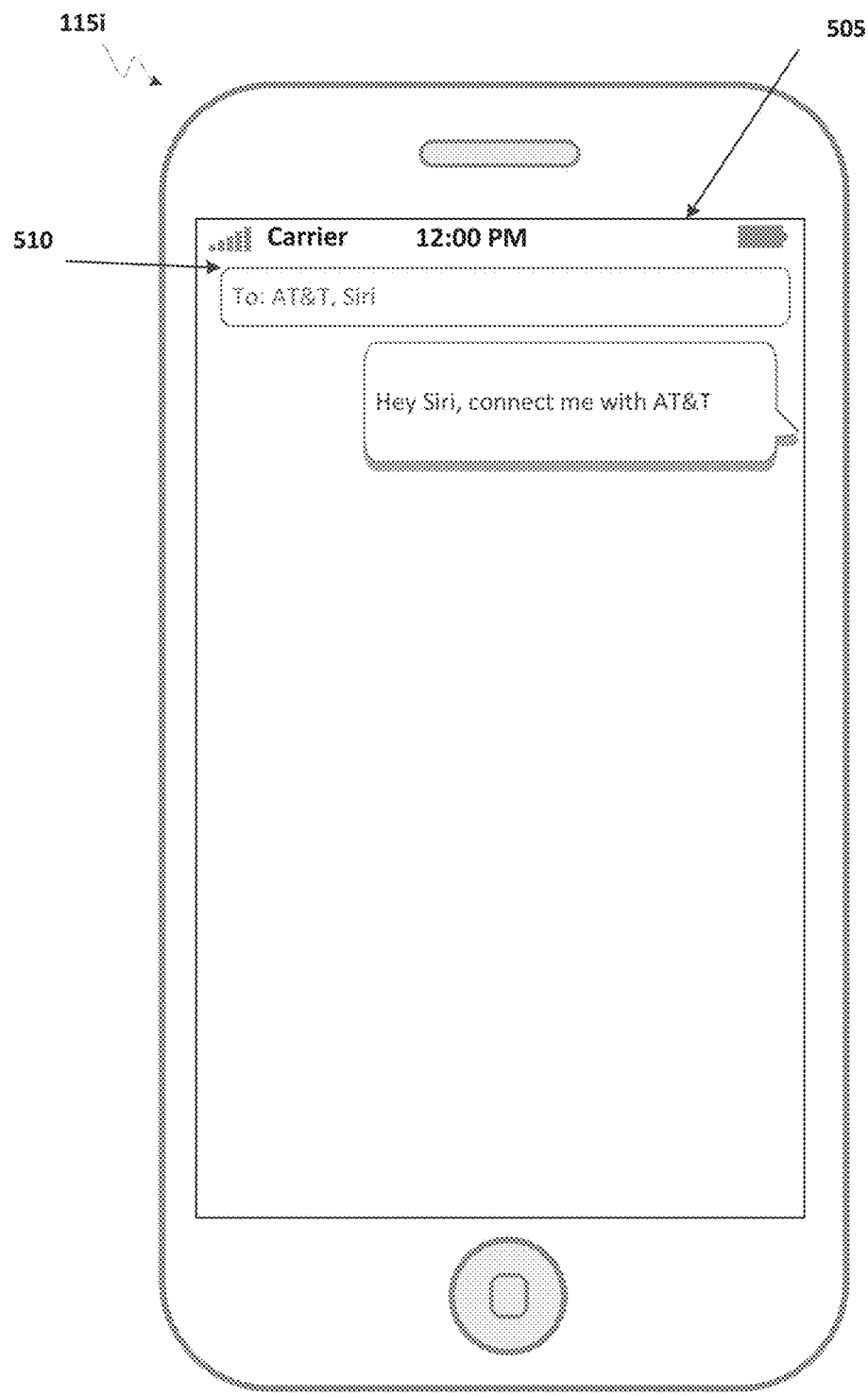
FIGS. 5A-5J shown another example of a virtual assistant assisting a participant of a communication session to communicate with a $3^{rd}$ party service.

FIGS. 5A-5J show another example of a virtual assistant assisting a participant of a communication session to communicate with a $3^{rd}$ party service. FIGS. 5A-5J will be discussed in view of the systems shown in FIG. 1 and FIG. 2. FIG. 5A shows a client device 115$_i$, used to conduct a communication session 505. The communication session 505 can be facilitated by communication application 205.

The communication session 505 can include a recipient list 410 identifying the other participants of the communication session 505. As shown, the only other participant of the communication session 505 is virtual assistant 210. Accordingly, messages provided by the user of the client device 115$_i$ as part of the communication session 505 will only be presented on the client device 115$_i$ and will not be transmitted to another client device 115. As shown, the user has entered a message directed to the virtual assistant 210 and requesting that the virtual assistant 210 assist the user communicate with a specified telephone provider.

Figure 5B:
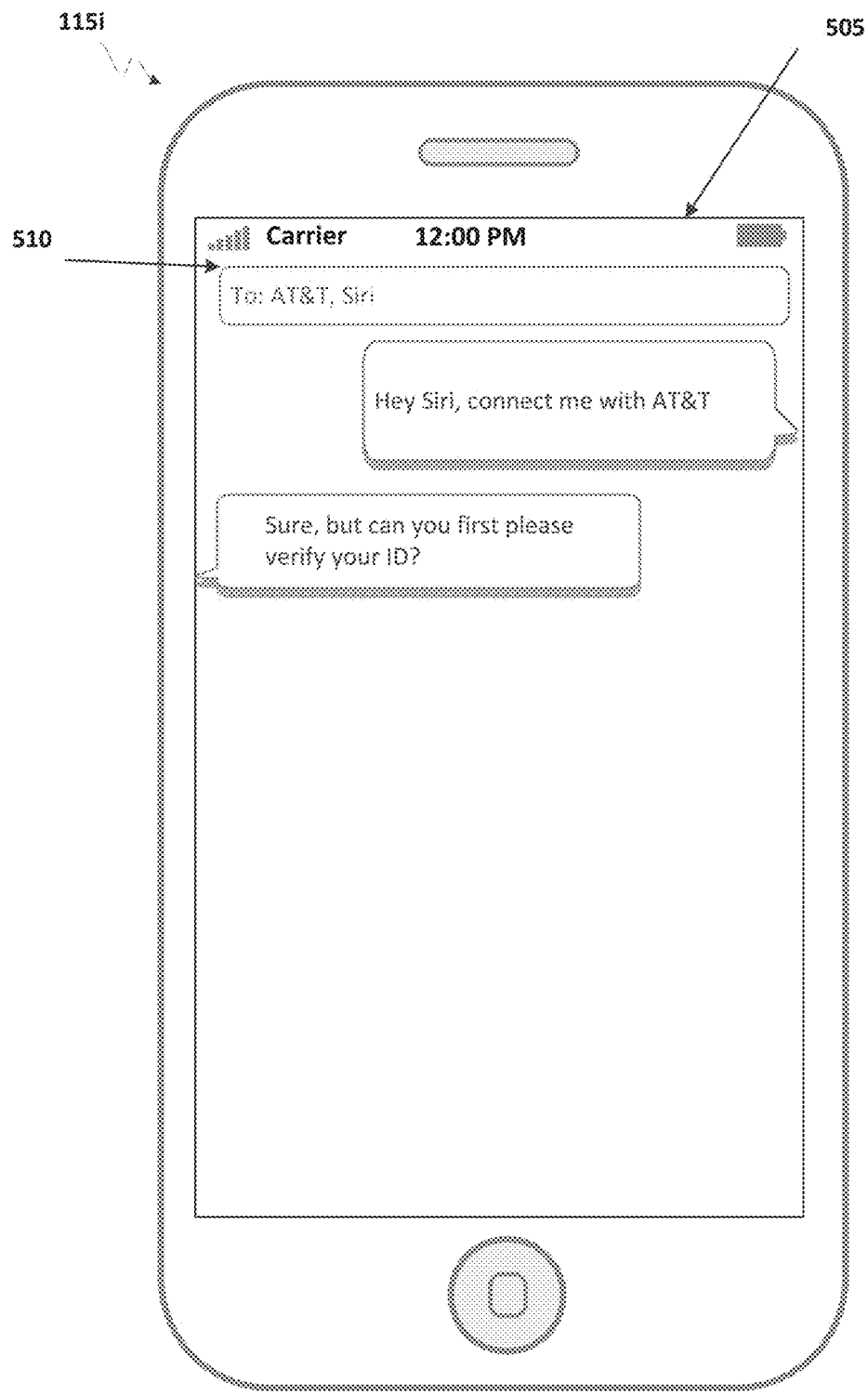
Figure 5C:
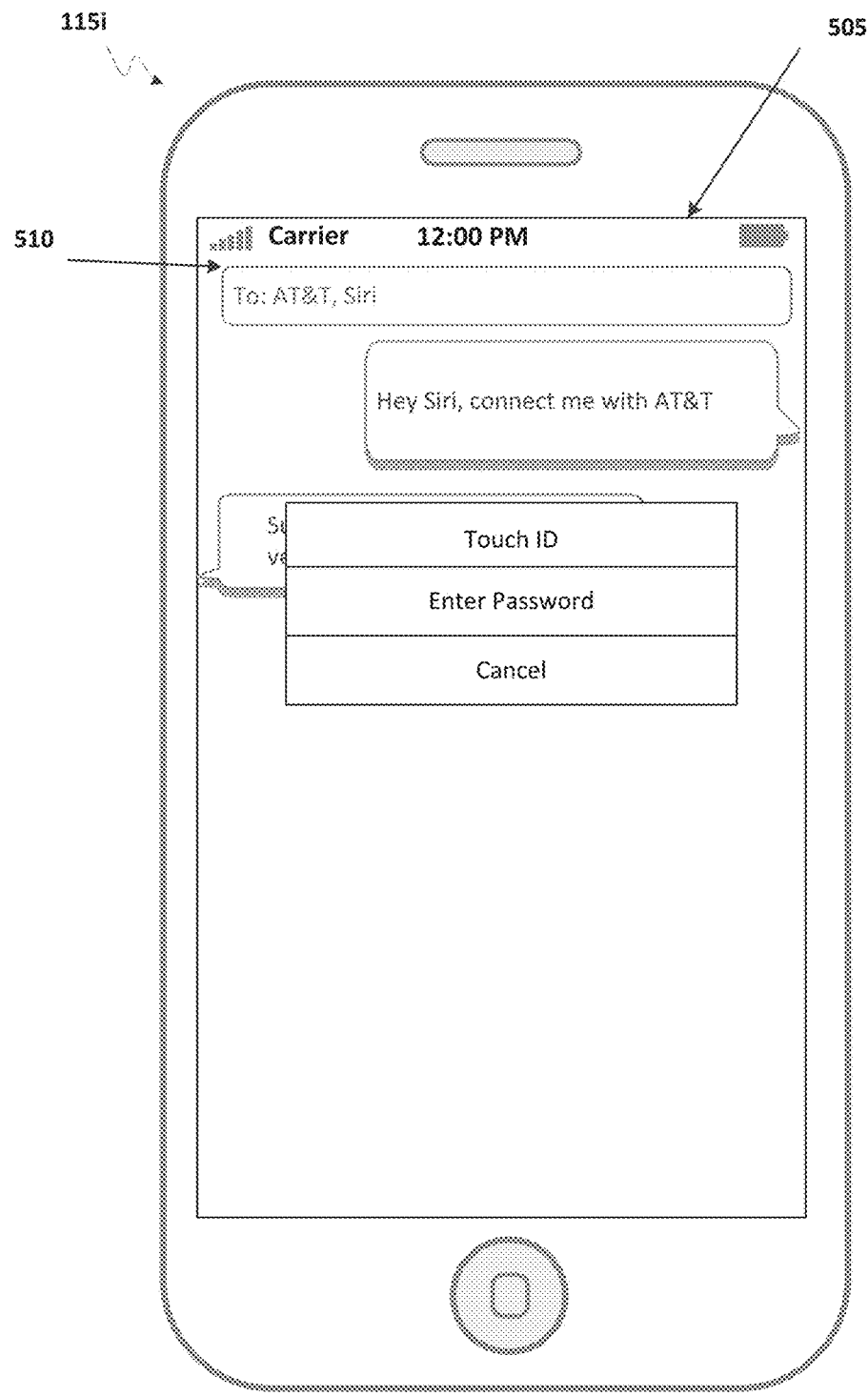

FIG. 5B shows that the virtual assistant 210 presented a follow up message responding to the users request and prompting the user to present authentication information. FIG. 5C shows that the user is prompted to either enter their password or, alternatively, authorize using their fingerprint.

Figure 5D:
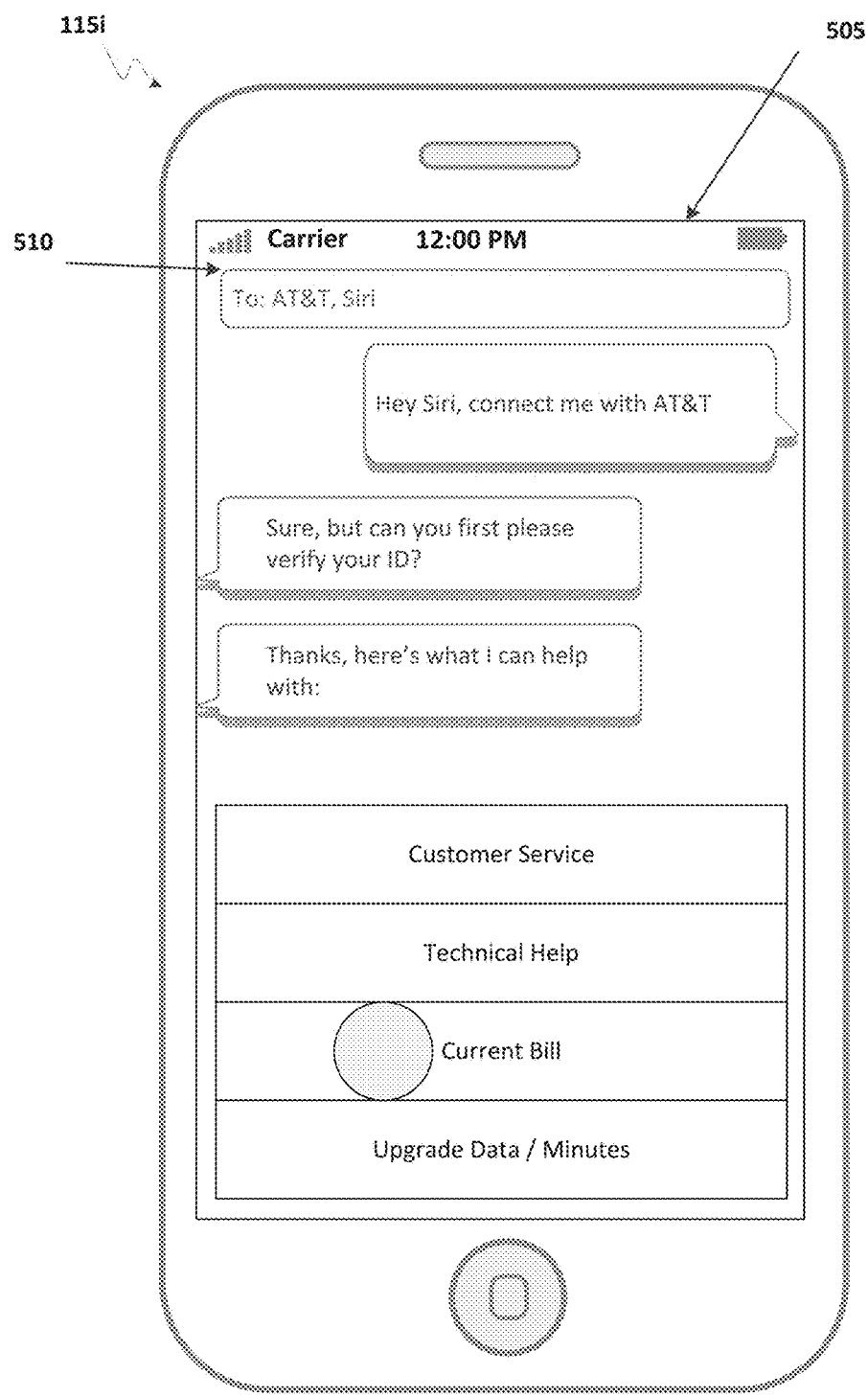

FIG. 5D shows that the virtual assistant 210 has presented the user with a poll to select from the services provided by the $3^{rd}$ party service. The virtual assistant 210 can identify the services from the set of communication instructions for the $3^{rd}$ party service.

Figure 5E:
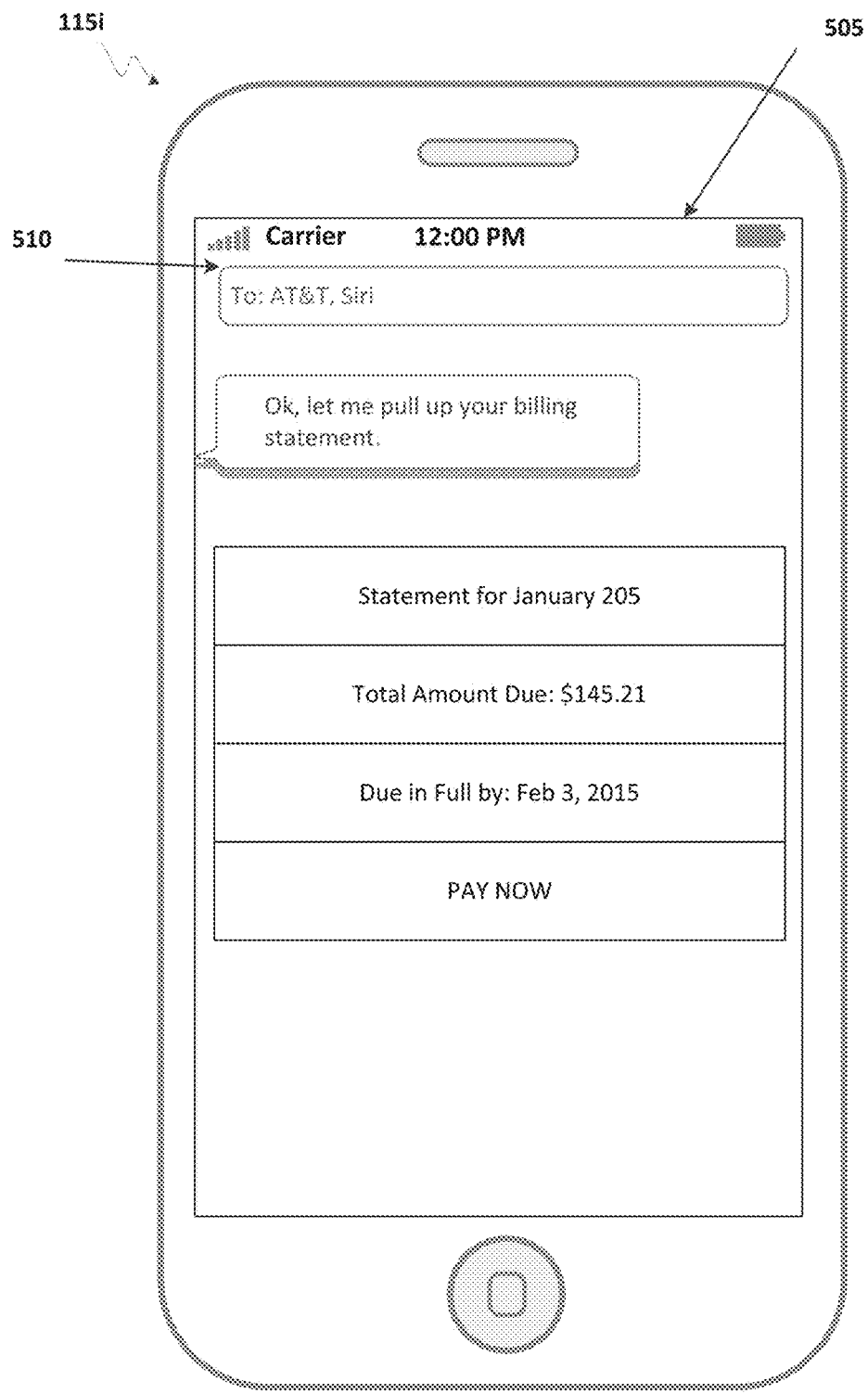

FIG. 5E shows that the virtual assistant 210 has presented the user with the user's current billing statement. The virtual assistant can use the set of communication instructions to gather the required data and commands to request the user's current billing statement, which can be presented as part of the communication session 505. Further, the user can select to pay the current bill through the communication session 505.

Figure 5F:
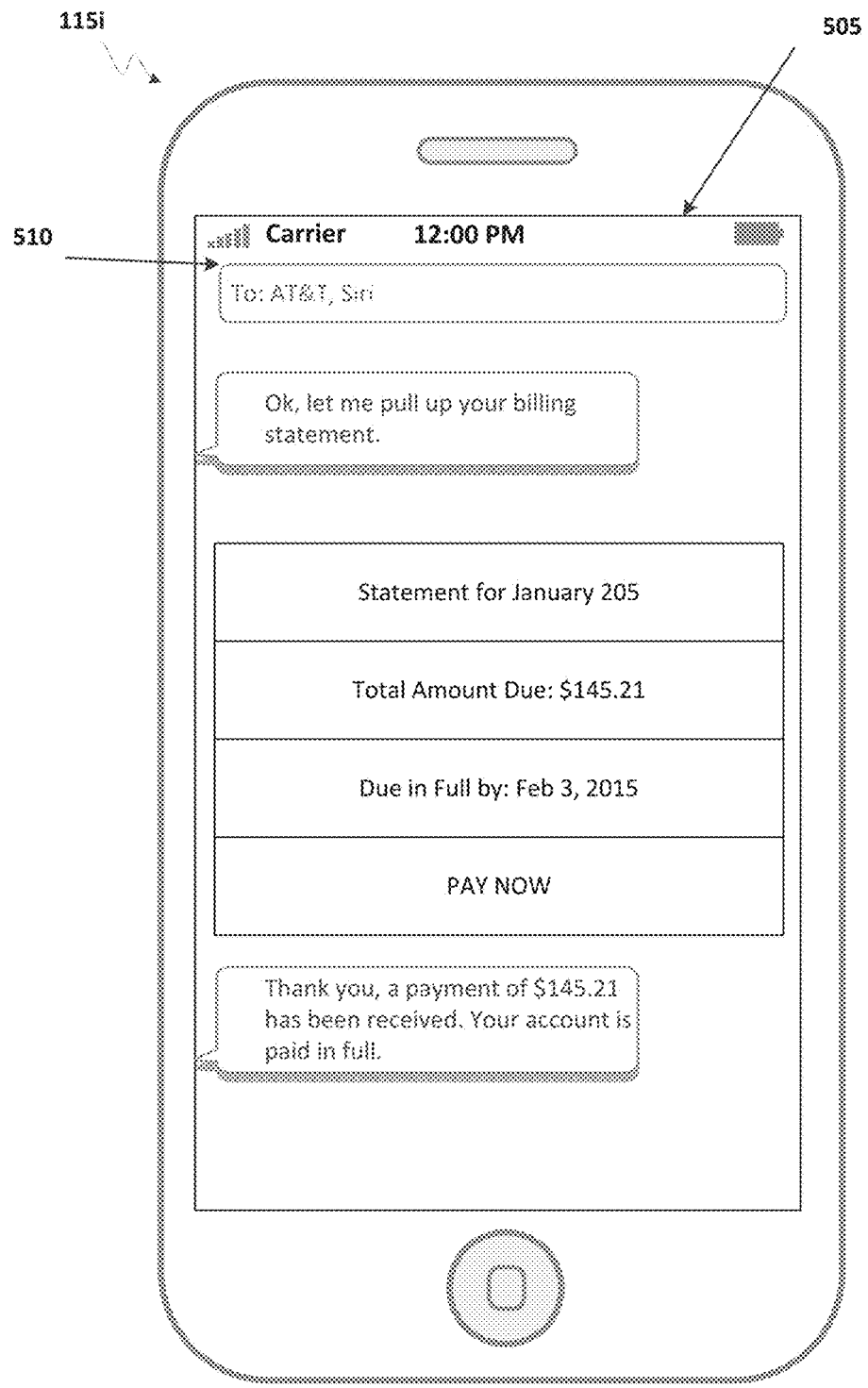

FIG. 5F shows that the user has been presented with confirmation that the user's payment has been received by the $3^{rd}$ party service.

Figure 5G:
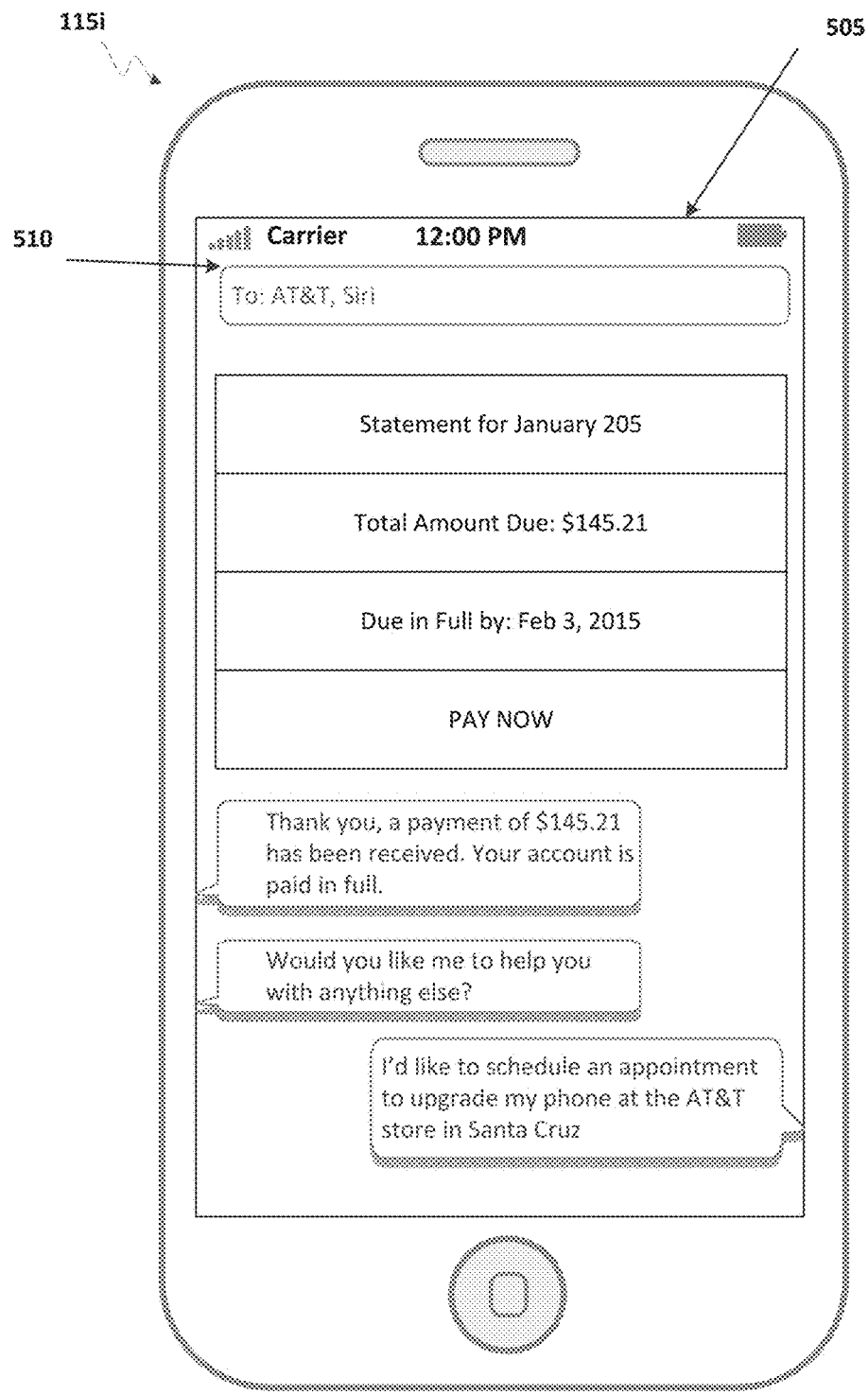

FIG. 5G shows that the virtual assistant 210 has prompted the user regarding whether the user needs further assistance. As shown, the user has responded that the user would like assistance scheduling an in-store appointment.

Figure 5H:
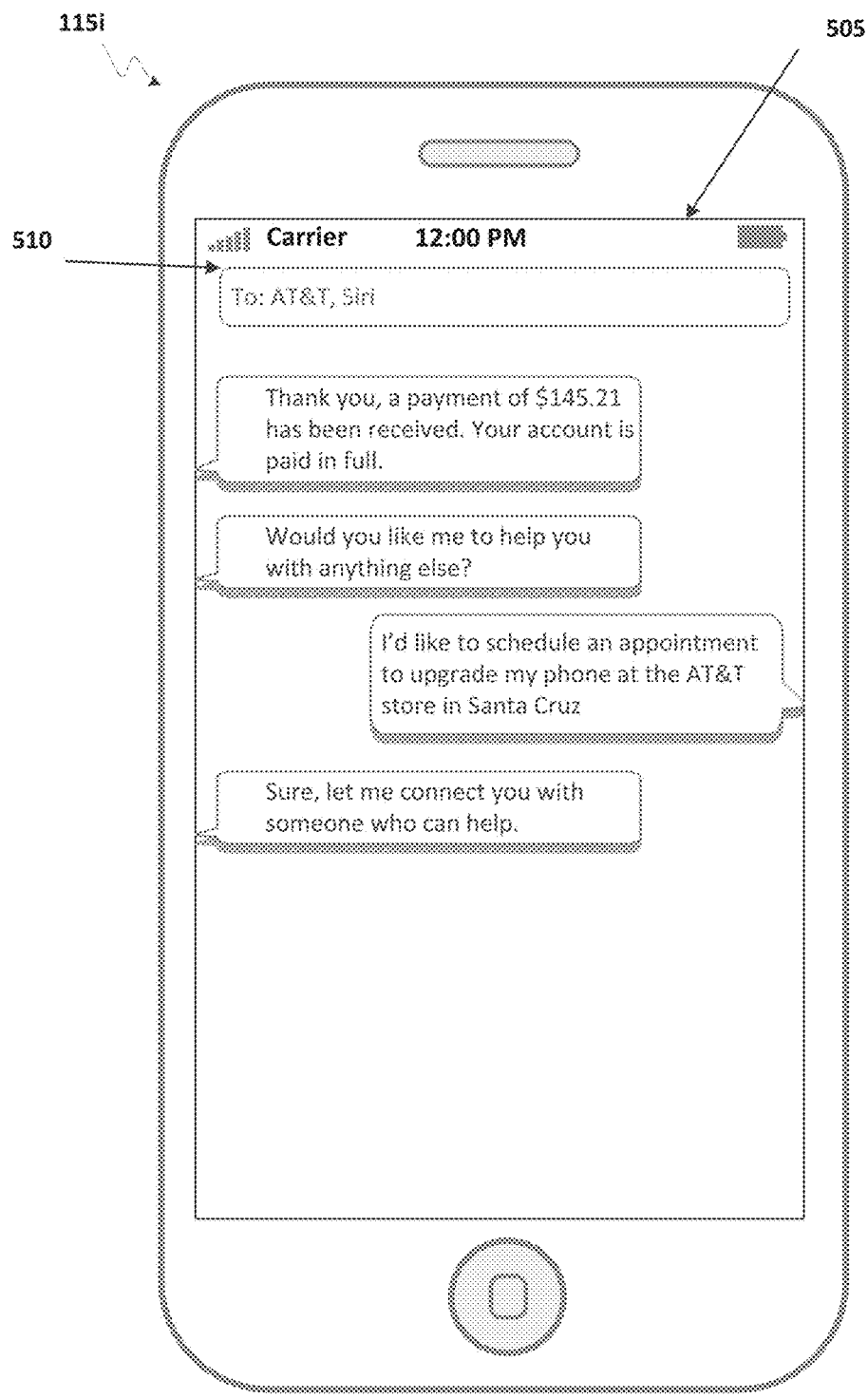

FIG. 5H shows that the virtual assistant 201 has responded to the user indicating that the virtual assistant will assist the user connect to a representative of the $3^{rd}$ party service.

Figure 5I:
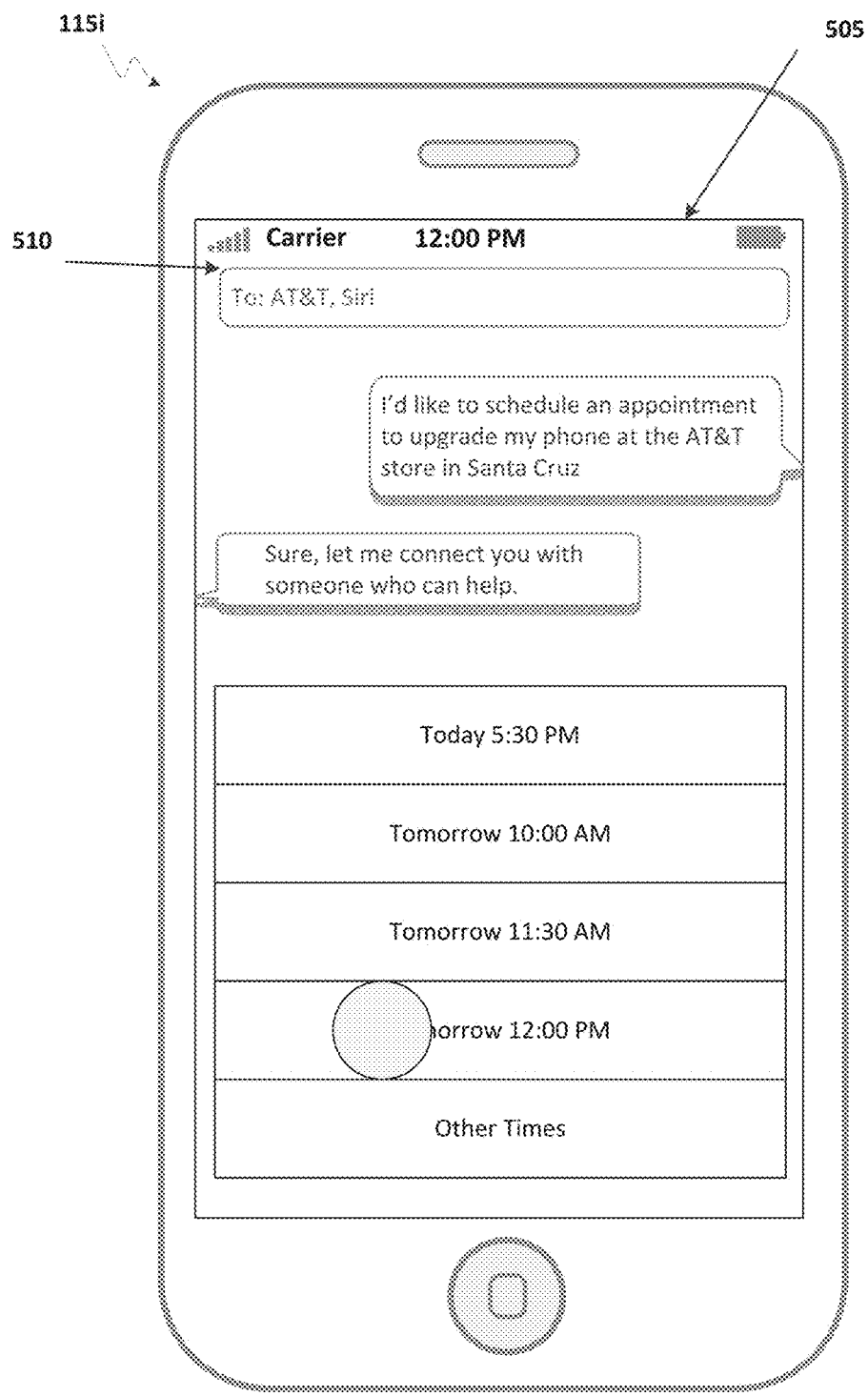

FIG. 5I shows that the user has been connected with a representative of the $3^{rd}$ party service and that the virtual assistant 210 is assisting the parties schedule a time to meet. As shown, the virtual assistant 210 has presented the user with a poll that lists multiple candidate times for the meeting. The virtual assistant 210 can gather data from a calendar of the user and the $3^{rd}$ party service to identify the set of candidate times during which both parties are free. A user can select one of the presented time to schedule the meeting.

Figure 5J:
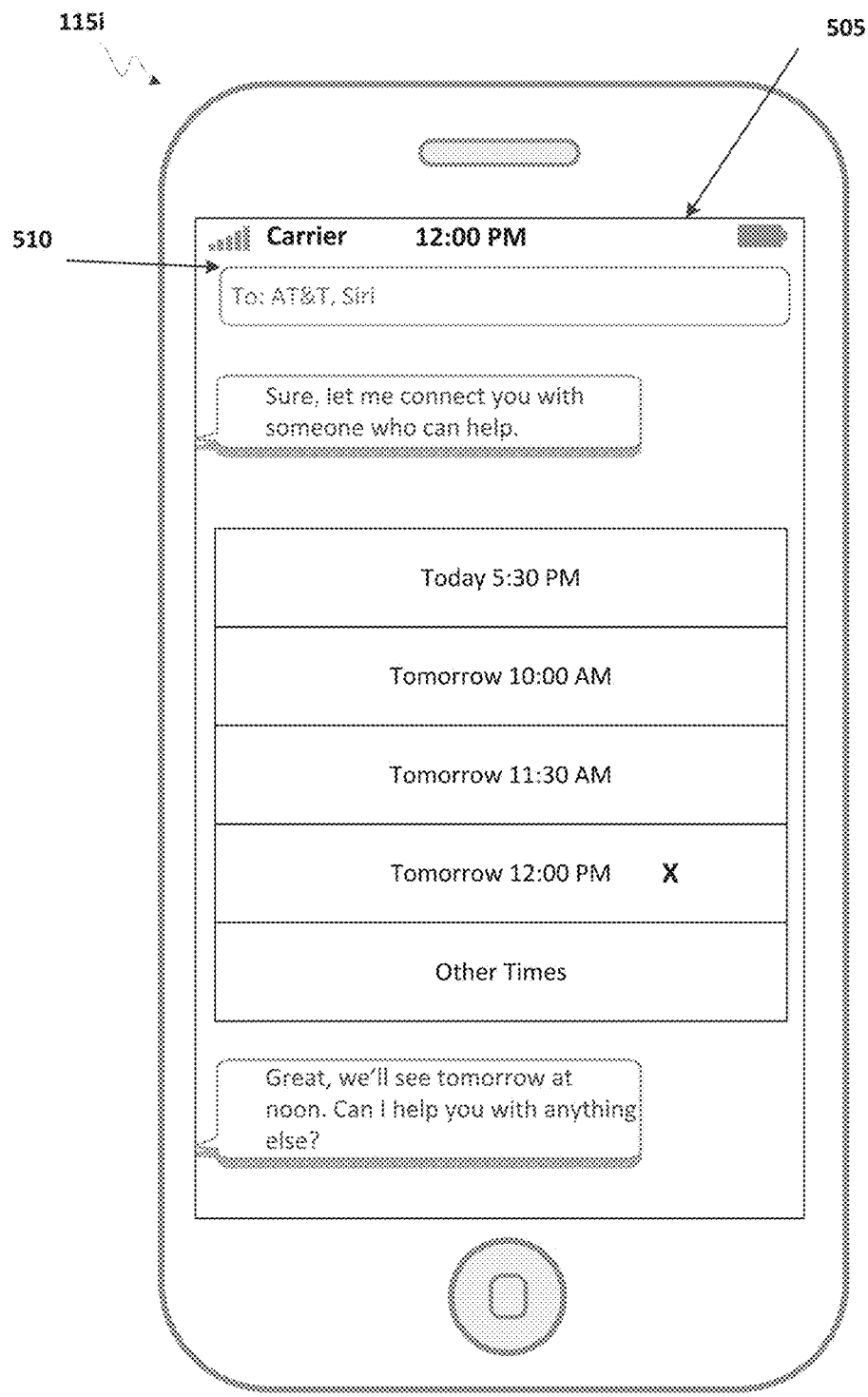

FIG. 5J shows that after the user has selected a time for the meeting, the representative of the $3^{rd}$ party service has presented the user with a message confirming the meeting.

FIG. 6A, and FIG. 6B illustrate exemplary possible system embodiments. The more appropriate embodiment will be apparent to those of ordinary skill in the art when practicing the present technology. Persons of ordinary skill in the art will also readily appreciate that other system embodiments are possible.

FIG. 6A illustrates a conventional system bus computing system architecture 600 wherein the components of the system are in electrical communication with each other using a bus 605. Exemplary system 600 includes a processing unit (CPU or processor) 610 and a system bus 605 that couples various system components including the system memory 615, such as read only memory (ROM) 520 and random access memory (RAM) 625, to the processor 610. The system 600 can include a cache of high-speed memory connected directly with, in close proximity to, or integrated as part of the processor 610. The system 600 can copy data from the memory 615 and/or the storage device 630 to the cache 612 for quick access by the processor 610. In this way, the cache can provide a performance boost that avoids processor 610 delays while waiting for data. These and other modules can control or be configured to control the processor 610 to perform various actions. Other system memory 615 may be available for use as well. The memory 615 can include multiple different types of memory with different performance characteristics. The processor 610 can include any general purpose processor and a hardware module or software module, such as module 1 632, module 2 634, and module 3 636 stored in storage device 630, configured to control the processor 610 as well as a special-purpose processor where software instructions are incorporated into the actual processor design. The processor 610 may essentially be a completely self-contained computing system, containing multiple cores or processors, a bus, memory controller, cache, etc. A multi-core processor may be symmetric or asymmetric.

To enable user interaction with the computing device 600, an input device 645 can represent any number of input mechanisms, such as a microphone for speech, a touch-sensitive screen for gesture or graphical input, keyboard, mouse, motion input, speech and so forth. An output device 635 can also be one or more of a number of output mechanisms known to those of skill in the art. In some instances, multimodal systems can enable a user to provide multiple types of input to communicate with the computing device 600. The communications interface 640 can generally govern and manage the user input and system output. There is no restriction on operating on any particular hardware arrangement and therefore the basic features here may easily be substituted for improved hardware or firmware arrangements as they are developed.

Storage device 630 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 625, read only memory (ROM) 620, and hybrids thereof.

The storage device 630 can include software modules 632, 634, 636 for controlling the processor 610. Other hardware or software modules are contemplated. The storage device 630 can be connected to the system bus 605. In one aspect, a hardware module that performs a particular function can include the software component stored in a computer-readable medium in connection with the necessary hardware components, such as the processor 610, bus 605, display 635, and so forth, to carry out the function.

FIG. 6B illustrates a computer system 650 having a chipset architecture that can be used in executing the described method and generating and displaying a graphical user interface (GUI). Computer system 650 is an example of computer hardware, software, and firmware that can be used to implement the disclosed technology. System 650 can include a processor 655, representative of any number of physically and/or logically distinct resources capable of executing software, firmware, and hardware configured to perform identified computations. Processor 655 can communicate with a chipset 660 that can control input to and output from processor 655. In this example, chipset 660 outputs information to output 665, such as a display, and can read and write information to storage device 670, which can include magnetic media, and solid state media, for example. Chipset 660 can also read data from and write data to RAM 675. A bridge 680 for interfacing with a variety of user interface components 685 can be provided for interfacing with chipset 660. Such user interface components 685 can include a keyboard, a microphone, touch detection and processing circuitry, a pointing device, such as a mouse, and so on. In general, inputs to system 650 can come from any of a variety of sources, machine generated and/or human generated.

Chipset 660 can also interface with one or more communication interfaces 590 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 655 analyzing data stored in storage 670 or 675. Further, the machine can receive inputs from a user via user interface components 685 and execute appropriate functions, such as browsing functions by interpreting these inputs using processor 655.

It can be appreciated that exemplary systems 600 and 650 can have more than one processor 610 or be part of a group or cluster of computing devices networked together to provide greater processing capability.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

The invention claimed is:

1. A method comprising:
   receiving, by a client device, a first message entered as part of a communication session;
   performing, by the client device, a semantic analysis of the first message to determine that the first message includes a request for a virtual assistant to facilitate communication with a third party;
   retrieving, by the client device, a set of communication instructions associated with the third party, wherein the set of communication instructions identifies a set of data needed by the third party to provide a third party service, and a set of commands for communicating with the third party;
   gathering, by the client device, the set of data from one or more memory locations accessible by the client device based on the set of communication instructions;
   transmitting, by the client device, the set of data to the third party using at least a first command of the set of commands; and
   receiving a response message from the third party regarding the third party service; and
   presenting, in the communication session, information corresponding to the response message received from the third party regarding the third party service.

2. The method of claim 1, further comprising:
   presenting a second message as part of the communication session, wherein the second message prompts input of at least a subset of the set of data needed by the third party.

3. The method of claim 1, wherein the set of communication instructions further identifies a set of services offered by the third party.

4. The method of claim 3, further comprising:
   presenting a third message as part of the communication session, wherein the third message prompts selection of a desired service from the set of desired services; and
   receiving an input identifying the selection of the desired service, wherein the set of data needed by the third party service is dependent on the desired service selected.

5. The method of claim 1, wherein retrieving the set of communication instructions associated with the third party service comprises:
   transmitting, to a server, an instruction request for the set of communication instructions, wherein the instruction request identifies the third party service; and
   receiving, from the server, the set of communication instructions.

6. The method of claim 1, further comprising:
   receiving, from the third party, a fourth message; and
   presenting the fourth message as part of the communication session.

7. The method of claim 1, further comprising:
   connecting the client device to the third party;
   determining that a predetermined amount of time has elapsed during which messages have not been entered as part of the communication session; and
   in response to the determination that the predetermined amount of time has elapsed, disconnecting the client device from the third party.

8. A client device comprising:
   at least one computer processor; and
   at least one memory containing instructions that, when executed, cause the at least one computer processor to:
   receive a first message entered as part of a communication session;
   perform a semantic analysis of the first message to determine that the first message includes a request for a virtual assistant to facilitate communication with a third party;
   retrieve a set of communication instructions associated with the third party, wherein the set of communication instructions identifies a set of data needed by the third party to provide a third party service, and a set of commands for communicating with the third party;
   gather, based on the set of communication instructions, the set of data from one or more memory locations accessible by the client device;
   transmit the set of data to the third party service using at least a first command of the set of commands;
   receive a response message from the third party regarding the third party service; and
   present, in the communication session, information corresponding to the response message received from the third party regarding the third party service.

9. The client device of claim 8, wherein the instructions further cause the at least one computer processor to:

present a second message as part of the communication session, wherein the second message prompts input of at least a subset of the set of data needed by the third party.

10. The client device of claim 8, wherein the set of communication instructions further identifies a set of services offered by the third party.

11. The client device of claim 10, wherein the instructions further cause the at least one computer processor to:
present a third message as part of the communication session, wherein the third message prompts selection of a desired service from the set of desired services; and
receive an input identifying the selection of the desired service, wherein the set of data needed by the third party service is dependent on the desired service selected.

12. The client device of claim 8, wherein the instructions to retrieve the set of communication instructions associated with the third party service comprise instructions to cause the at least one computer processor to:
transmit, to a server, an instruction request for the set of communication instructions, wherein the instruction request identifies the third party service; and
receive, from the server, the set of communication instructions.

13. The client device of claim 8, wherein the instructions further cause the at least one computer processor to:
receive, from the third party, a fourth message; and
present the fourth message as part of the communication session.

14. The client device of claim 8, wherein the instructions further cause the at least one computer processor to:
connect the client device to the third party;
determine that a predetermined amount of time has elapsed during which messages have not been entered as part of the communication session; and
in response to the determination that the predetermined amount of time has elapsed, disconnect the client device from the third party.

15. At least one non-transitory computer-readable medium containing instructions that, when executed by at least one computer processor, cause the at least one computer processor to:
receive a first message entered as part of a communication session;
perform a semantic analysis of the first message to determine that the first message includes a request for a virtual assistant to facilitate communication with a third party;
retrieve a set of communication instructions associated with the third party, wherein the set of communication instructions identifies a set of data needed by the third party to provide a third party service, and a set of commands for communicating with the third party;
gather, based on the set of communication instructions, the set of data from one or more memory locations accessible by the client device;
transmit the set of data to the third party using at least a first command of the set of commands;
receive a response message from the third party regarding the third party service; and
present, in the communication session, information corresponding to the response message received from the third party regarding the third party service.

16. The at least one non-transitory computer-readable medium of claim 15, wherein the instructions further cause the at least one computer processor to:
present a second message as part of the communication session, wherein the second message prompts input of at least a subset of the set of data needed by the third party.

17. The at least one non-transitory computer-readable medium of claim 15, wherein the set of communication instructions further identifies a set of services offered by the third party.

18. The at least one non-transitory computer-readable medium of claim 17, wherein the instructions further cause the at least one computer processor to:
present a third message as part of the communication session, wherein the third message prompts selection of a desired service from the set of desired services; and
receive the selection of the desired service, wherein the set of data needed by the third party service is dependent on the desired service selected.

19. The at least one non-transitory computer-readable medium of claim 15, wherein the instructions to retrieve the set of communication instructions associated with the third party service comprise instructions to cause the at least one computer processor to:
transmit, to a server, an instruction request for the set of communication instructions, the instruction request identifying the third party service; and
receive, from the server, the set of communication instructions.

20. The at least one non-transitory computer-readable medium of claim 15, wherein the instructions further cause the at least one computer processor to:
receive, from the third party, a fourth message; and
present the fourth message as part of the communication session.

21. The at least one non-transitory computer-readable medium of claim 15, wherein the instructions further cause the at least one computer processor to:
connect the client device to the third party;
determine that a predetermined amount of time has elapsed during which messages have not been entered as part of the communication session; and
in response to the determination that the predetermined amount of time has elapsed, disconnect the client device from the third party.

* * * * *